(12) United States Patent
Ezawa et al.

(10) Patent No.: US 10,123,004 B2
(45) Date of Patent: Nov. 6, 2018

(54) IMAGE STABILIZATION APPARATUS AND IMAGE PICKUP APPARATUS USING IMAGE STABILIZATION APPARATUS

(71) Applicant: OLYMPUS CORPORATION, Hachioji-shi, Tokyo (JP)

(72) Inventors: Hiroshi Ezawa, Yokohama (JP); Takashi Ishikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 89 days.

(21) Appl. No.: 15/366,930

(22) Filed: Dec. 1, 2016

(65) Prior Publication Data

US 2017/0223347 A1    Aug. 3, 2017

(30) Foreign Application Priority Data

Jan. 28, 2016 (JP) .................................. 2016-014473
Mar. 22, 2016 (JP) .................................. 2016-057333

(51) Int. Cl.
*H04N 17/00* (2006.01)
*H04N 5/232* (2006.01)
*H04N 5/225* (2006.01)

(52) U.S. Cl.
CPC ......... *H04N 17/002* (2013.01); *H04N 5/2251* (2013.01); *H04N 5/2328* (2013.01); *H04N 5/23258* (2013.01); *H04N 5/23287* (2013.01)

(58) Field of Classification Search
CPC .................................................. H04N 5/23287
See application file for complete search history.

(56) References Cited

U.S. PATENT DOCUMENTS

| | | | |
|---|---|---|---|
| 2005/0168582 A1* | 8/2005 | Stuckler | H04N 5/23248 348/208.2 |
| 2007/0109412 A1* | 5/2007 | Hara | H04N 5/2251 348/207.1 |
| 2013/0063615 A1* | 3/2013 | Takeuchi | H04N 5/23258 348/208.5 |

FOREIGN PATENT DOCUMENTS

JP    3738682 B2    1/2006

* cited by examiner

*Primary Examiner* — Christopher K Peterson
(74) *Attorney, Agent, or Firm* — Holtz, Holtz & Volek PC

(57) ABSTRACT

An image stabilization apparatus includes a fixed barrel, a movable barrel, a support member configured to movably support the movable barrel with respect to the fixed barrel, a drive unit configured to include a magnet and a coil, and drive the movable barrel, a control section configured to drive and control the drive unit, a position detection section configured to detect a position of the movable barrel, and a judgment section configured to detect, when the drive unit drives via the movable barrel so as to move to a predetermined target position, a deviation between the position of the movable barrel and the predetermined target position and judge whether or not the apparatus operates normally based on whether or not the deviation falls within a first allowable range.

14 Claims, 16 Drawing Sheets

IMAGE STABILIZATION APPARATUS AND IMAGE PICKUP APPARATUS USING IMAGE STABILIZATION APPARATUS

CROSS REFERENCE TO RELATED APPLICATIONS

This application claims the benefit of Japanese Application No. 2016-014473 filed in Japan on Jan. 28, 2016, Japanese Application No. 2016-057333 filed in Japan on Mar. 22, 2016, the contents of which are incorporated herein by this reference.

BACKGROUND OF THE INVENTION

1. Field of the Invention

The present invention relates to an image stabilization apparatus provided with a mechanism configured to correct image blur of an optical image formed by an image pickup optical system and an image pickup apparatus to which the image stabilization apparatus is applied.

2. Description of the Related Art

Conventionally, image pickup apparatuses are generally commercialized which are configured to sequentially photoelectrically convert optical images formed by an image pickup optical system using an image pickup device or the like, store the image signals thereby acquired in a storage medium as image data (still image) or video data (movie) in a predetermined mode and transmit the acquired image signals to an image display apparatus so as to be able to sequentially displayed.

Furthermore, in recent years, various camera systems are becoming widespread which install and fix the aforementioned type of image pickup apparatus outdoors or indoors so as to be able to monitor a situation of a region or space to be imaged all the time intended for fixed-point observation, monitoring or crime prevention.

Furthermore, among such camera systems, a type of network camera system or the like is being commercialized which includes an image pickup apparatus, a terminal apparatus and an image display apparatus or the like, all of which are connected to an existing network such as the Internet. Such a network camera system is configured such that by operating the terminal apparatus, an operator (user) can remotely operate the image pickup apparatus via the network, receive image data and video data acquired by the image pickup apparatus through the terminal apparatus via the network, display and confirm images based on the received image data and video data using an image display apparatus connected to the terminal apparatus.

Furthermore, various types of so-called vehicle-mounted camera systems or the like are commercialized and widely used in which a type of image pickup apparatus similar to that applied to the above network camera systems or the like is installed and fixed in a vehicle or the like to thereby display, on an image display apparatus, images of situations of a region which becomes a blind spot when seen from a driver's seat such as a rearward region or a sideward region of the vehicle, consecutively pick up images of regions surrounding the running vehicle to thereby record movie data for predetermined time periods before and after a predetermined time point (e.g., a time point at which an abnormal impact is received (a so-called time point of accident occurrence)) in a recording medium and use the acquired forward field of view images or the like to control a lane keeping function or emergency stop function.

The image pickup apparatus applied to camera systems or the like of such a type tend to be often installed and fixed outdoors, indoors or inside or outside a vehicle or the like where the image pickup apparatus is not easily accessible to an operator's (user's) hand and is operated continuously in such a stationary state for a long period of time.

On the other hand, as image pickup apparatuses applied to such a type of camera systems or the like, image pickup apparatuses provided with an image stabilization apparatus are generally commercialized which are configured to be able to correct so-called image blur caused by a phenomenon in which the image pickup apparatus shakes when an image pickup operation is in progress, causing an optical image formed by an image pickup optical system to become unstable on a light receiving surface of the image pickup device.

Examples of such a type of image stabilization apparatus include a so-called lens shift type optical image stabilization mechanism whereby image stabilization is performed by moving, for example, part of optical lenses making up the image pickup optical system within a plane orthogonal to an optical axis O of the image pickup optical system and a so-called sensor shift type optical image stabilization mechanism whereby image stabilization is performed by moving, for example, an image pickup device within a plane along a light receiving surface of the image pickup device (within the plane orthogonal to the optical axis O of the image pickup optical system).

Since the image pickup apparatuses in the above network camera systems or the like are continuously operated for a long period of time as described above, the image stabilization apparatuses or the like also continue operating all the time.

Regarding image pickup apparatuses in the conventional network camera systems or the like, various image pickup apparatuses provided with abnormality detecting means which, for example, receives remote operation from a terminal apparatus side and detects the condition of the image pickup apparatus such as the presence or absence of problems and abnormalities in the device are being proposed, for example, in Japanese Patent No. 3738682.

The device abnormality detection system disclosed in above Japanese Patent No. 3738682 includes a plurality of local terminals to be managed, an abnormality judgment apparatus installed in the install locations of the local terminals and configured to judge the occurrence of abnormalities including malfunctions in the local terminals and a management side terminal provided in a location far from the install locations of the local terminals, the local terminals having self-diagnosing means configured to function at the request from the abnormality judgment apparatus to diagnose the conditions of the local terminals and notify the abnormality judgment apparatus of the diagnosis result, and the abnormality judgment apparatus having a function of requesting, upon a request from the management side terminal, execution of a diagnosis by the self-diagnosing means on the local terminals and a function of receiving the diagnosis result from the local terminals and informing, when the occurrence of an abnormality or a symptom of the abnormality in the local terminals is detected from the diagnosis result, the management side terminal of the abnormality.

SUMMARY OF THE INVENTION

An image stabilization apparatus according to an aspect of the present invention includes a fixed barrel, a movable barrel configured to hold an optical lens or an image pickup device, a support member configured to movably support the movable barrel with respect to the fixed barrel within a plane orthogonal to an optical axis of the optical lens or within a plane along a light receiving surface of the image pickup device, a drive unit configured to include a magnet and a coil, and drive the movable barrel with respect to the fixed barrel, a control section configured to drive and control the drive unit, a position detection section configured to detect a position of the movable barrel within the plane, and a judgment section configured to detect, when the control section drives and controls, via the drive unit, the movable barrel so as to move to a predetermined target position, a deviation between the position of the movable barrel detected by the position detection section and the predetermined target position and judge whether or not the apparatus operates normally based on whether or not the deviation falls within a first allowable range.

An image pickup apparatus using the image stabilization apparatus according to an aspect of the present invention includes, a fixed barrel, a camera unit configured to include an image pickup device and an image pickup optical system, a case configured to accommodate the camera unit, a cover member configured to cover and protect part of the camera unit, and the above image stabilization apparatus.

An image stabilization apparatus according to another aspect of the present invention is an image stabilization apparatus including a movable barrel configured to hold an optical lens or an image pickup device, a support member configured to movably support the movable barrel with respect to the fixed barrel within a plane orthogonal to an optical axis of the optical lens or within a plane along a light receiving surface of the image pickup device, a drive unit configured to include a magnet and a coil, and drive the movable barrel with respect to the fixed barrel, a control section configured to drive and control the drive unit, a position detection section configured to detect a position of the movable barrel within the plane, and a judgment section configured to detect, when the control section drives and controls, via the drive unit, the movable barrel so as to move to a predetermined target position, a deviation between the position of the movable barrel detected by the position detection section and the predetermined target position and judge whether or not the apparatus operates normally based on whether or not the deviation falls within the allowable range, in which when the judgment section judges that the apparatus does not operate normally, the control section restricts the operation of the image stabilization apparatus.

An image pickup apparatus using the image stabilization apparatus according to a further aspect of the present invention includes a camera unit including an image pickup device and an image pickup optical system, a case configured to accommodate the camera unit, a cover member configured to cover and protect part of the camera unit and the above image stabilization apparatus.

Benefits of the invention will become more apparent from the following detailed description.

DETAILED DESCRIPTION OF THE PREFERRED EMBODIMENTS

Figure 1:
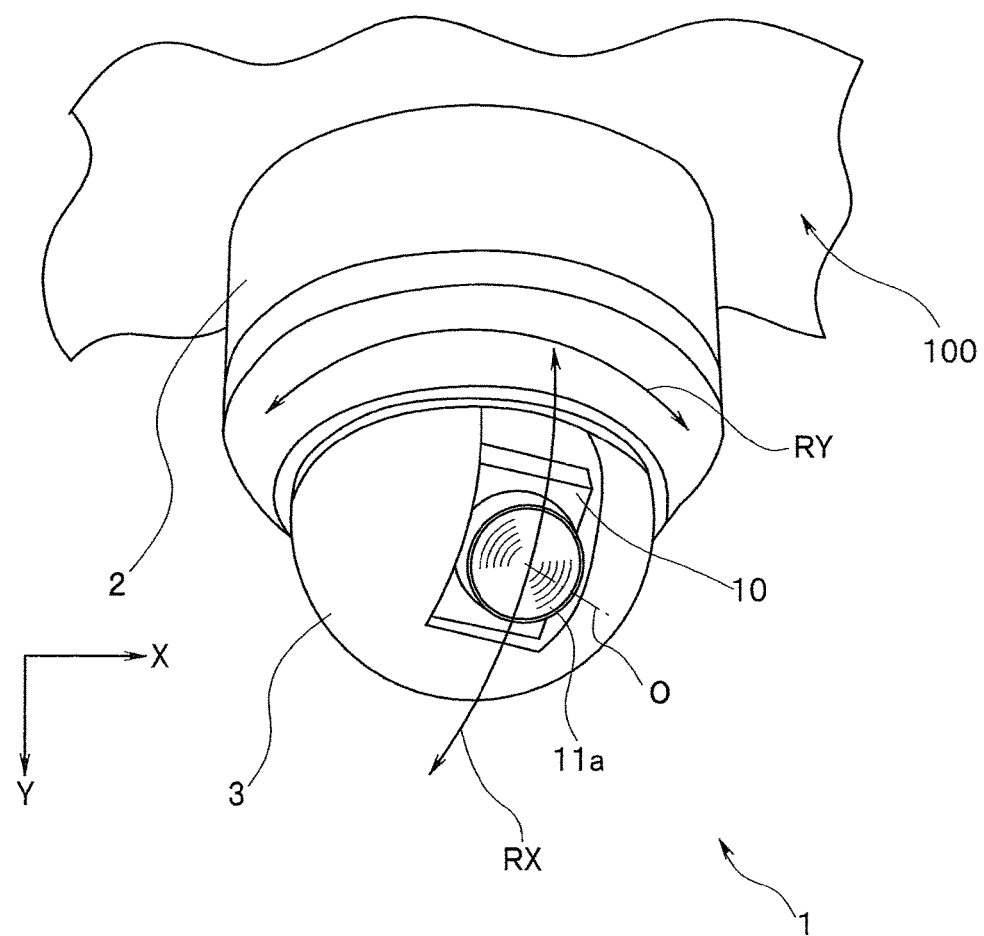
FIG. 1 is an external perspective view schematically illustrating an exterior appearance of an image pickup apparatus according to a first embodiment of the present invention.

Hereinafter, the present invention will be described according to embodiments illustrated in the accompanying drawings. The respective drawings used for the following description are intended for schematic illustration, and respective components may be shown in different dimensional relationships and scales among respective members, varying from one component to another so that the respective components are shown in sizes they are recognizable on the drawings. Therefore, the present invention is not limited to only the illustrated modes with regard to quantities of the components, shapes of the components, size ratios among the components and relative positional relationships among the components described in the respective drawings.

Note that an X-axis shown in the drawings indicates an axis in a horizontal direction as the front view and a Y-axis indicates an axis in a direction orthogonal to the X-axis and in a vertical direction as the front view. On the other hand, a Z-axis is based on an optical axis O of the image pickup optical system and indicates an axis in a direction that coincides with the optical axis O.

Figure 2:
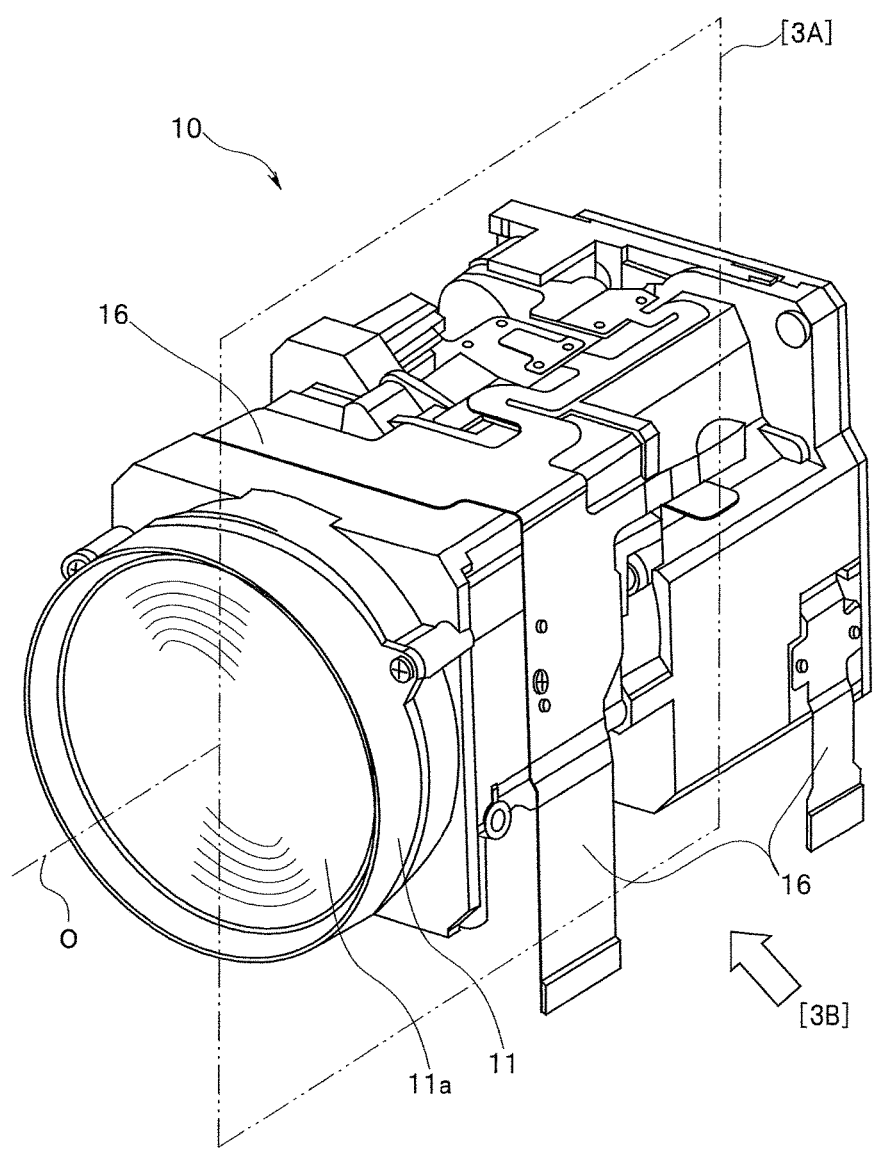
FIG. 2 is an enlarged perspective view of main parts showing an enlarged view of a principal component (camera unit) extracted from the image pickup apparatus in FIG. 1.
Figure 3:
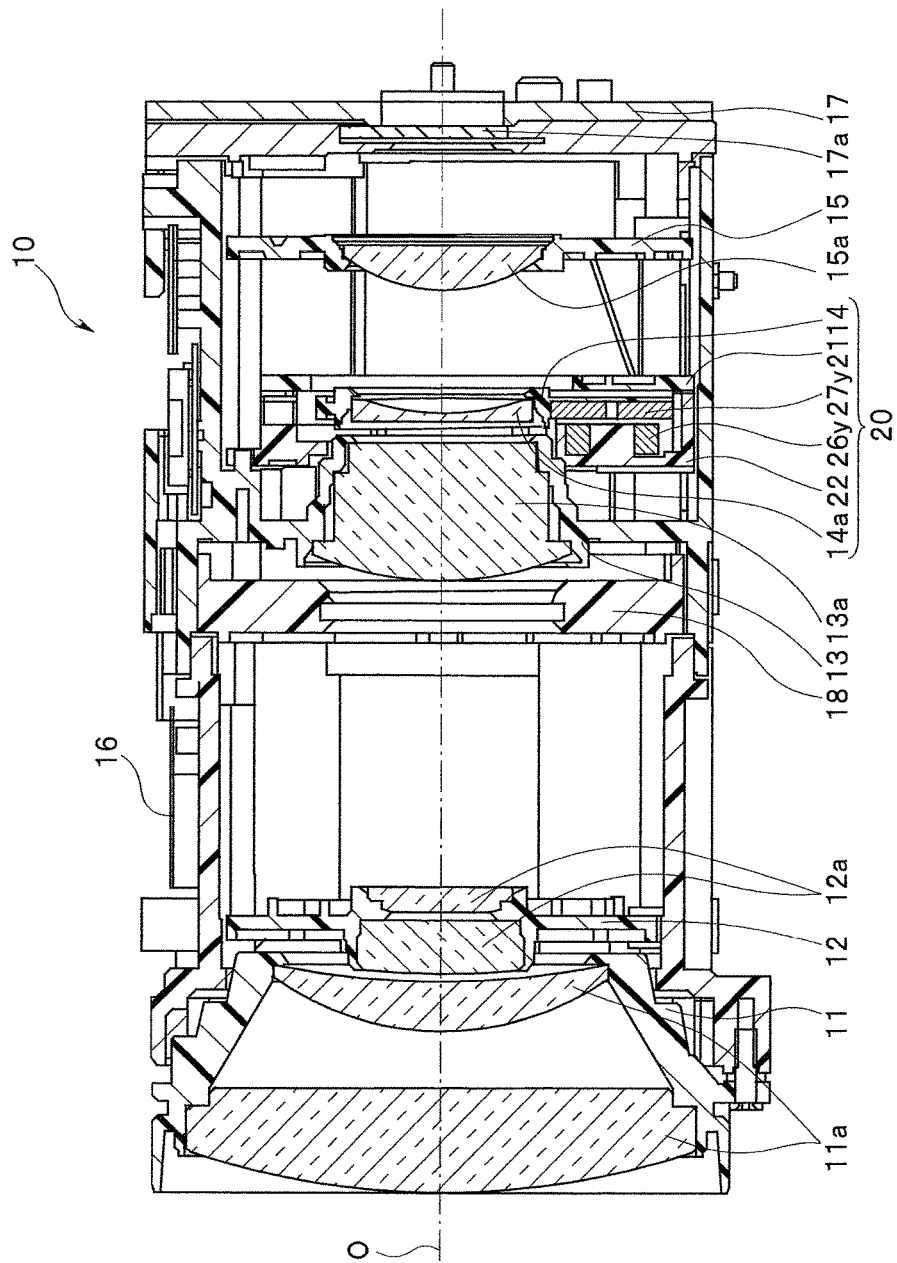
FIG. 3 is a longitudinal cross-sectional view of a cross section along a plane denoted by reference character [3A] in FIG. 2, seen from a direction shown by an arrow denoted by reference character [3B] in FIG. 2.

FIG. 1 to FIG. 13 are diagrams illustrating a first embodiment of the present invention. Among them, FIG. 1 is an external perspective view schematically illustrating an exterior appearance of an image pickup apparatus of the present embodiment. FIG. 2 is an enlarged perspective view of main parts showing an enlarged view of a principal component (camera unit) extracted from the image pickup apparatus in FIG. 1. FIG. 3 is a longitudinal cross-sectional view of a cross section along a plane denoted by reference character [3A] in FIG. 2, seen from a direction shown by an arrow denoted by reference character [3B] in FIG. 2.

First, a schematic configuration of an image pickup apparatus to which an image stabilization apparatus according to the first embodiment of the present invention is applied will be described below using mainly FIG. 1 to FIG. 3.

An image pickup apparatus 1 to which the image stabilization apparatus of the present embodiment is applied is installed and fixed outdoors or indoors on, for example, a ceiling or a wall surface or a predetermined pillar or a pedestal. The image pickup apparatus 1 is configured so as to be able to monitor a situation of a region or space to be imaged in the installation place all the time, and is an example of an image pickup apparatus included in a network camera system intended for fixed-point observation, monitoring or crime prevention, or the like.

The image pickup apparatus 1 is mainly constructed of a case 2, a cover member 3, a camera unit 10 and the like as shown in FIG. 1.

The case 2 is an exterior member having, for example, a substantially cylindrical shape and configured to accommodate and arrange the camera unit 10 inside. The case 2 is fixed to, for example, a ceiling 100.

The cover member 3 is a protective member having, for example, a substantially dome shape (semispherical shape) and configured to cover and protect part of the camera unit 10 accommodated in the case 2 and the front surface of an image pickup optical system. The cover member 3 also plays the role for securing a moving space for the image pickup optical system when changing the orientation of the optical axis O so that the camera unit 10 changes the image pickup region inside the case 2.

The camera unit 10 includes the image pickup optical system (only part of which is shown in FIG. 1, see reference numeral 11a) and an image pickup device (not shown in FIG. 1, see reference numeral 17a in FIG. 3) or the like, and is a configuration unit provided with an image pickup function. The camera unit 10 is connected to a terminal apparatus (not shown) such as a desktop type, notebook type or tablet type personal computer or a portable communication terminal apparatus called a "smartphone" or the like directly via a wired cable or wireless communication means or indirectly via a network or the like which is not shown. Note that although not shown, an image display apparatus (not shown) is connected to the terminal apparatus and the image display apparatus can receive image data or video data acquired by the camera unit 10, display an image, a video or the like and display a control screen (menu screen) or the like when remotely operating the camera unit 10 using the terminal apparatus.

The camera unit 10 is configured to be able to change the orientation of the optical axis O of the image pickup optical system within an inner space of the cover member 3 as described above. That is, the camera unit 10 is provided with a predetermined rotation drive mechanism (not shown) to enable the camera unit 10 to rotate in a panning direction which is a direction along an arrow RY shown in FIG. 1 (lateral rotation, that is, rotation around the Y-axis in FIG. 1, a rotatable range of which is, for example, an angle of rotation of approximately 360 degrees) and in a tilting direction which is a direction along an arrow RX shown in FIG. 1 (longitudinal rotation, that is, rotation along the XY plane in FIG. 1, a rotatable range of which is, for example, an angle of rotation of approximately 90 to 180 degrees).

Note that since the rotation drive mechanism of the camera unit 10 is a part not directly related to the present invention, illustration and description of the rotation drive mechanism will be omitted because a mechanism similar to a conventional and generally commercialized mechanism is assumed to be applied to the part.

As shown in FIG. 2 and FIG. 3, the camera unit 10 is mainly constructed of an image pickup optical system composed of a plurality of optical lenses (11a, 12a, 13a, 14a and 15a; only partially illustrated in FIG. 2; see mainly FIG. 3), a plurality of lens group holding members (11, 12, 13, 14 and 15; only partially illustrated in FIG. 2; see mainly FIG. 3) configured to hold the plurality of optical lenses (11a, 12a, 13a, 14a and 15a) in predetermined group units, an image stabilization apparatus 20 (not shown in FIG. 2; see FIG. 3) configured to move part of the lens group holding members within a plane (hereinafter, referred to as an "XY plane") orthogonal to an optical axis O and thereby contribute to an image stabilization operation, a drive mechanism (not shown) configured to move others of the lens group holding members forward or backward in the direction along the optical axis O and thereby contribute to an auto focus (AF) operation or a scaling (zooming) operation, a diaphragm mechanism 18 (not shown in FIG. 2; see FIG. 3) configured to adjust a light quantity of an image pickup light flux that passes through the image pickup optical system, an image pickup substrate 17 (not shown in FIG. 2; see FIG. 3) provided with an image pickup device 17a and configured to drive the image pickup device 17a, and electric parts including a plurality of flexible printed circuit boards 16 configured to extend from the above-described drive mechanism (not shown), the image pickup substrate 17, and the like.

The image pickup optical system of the camera unit 10 illustrated in the present embodiment is constructed of five lens groups of the first lens group 11a, the second lens group 12a, the third lens group 13a, the fourth lens group 14a and the fifth lens group 15a. The respective lens groups are held by the first lens group holding member 11, the second lens group holding member 12, the third lens group holding member 13, the fourth lens group holding member 14 and the fifth lens group holding member 15 respectively.

Among these lens group holding members, the fourth lens group holding member 14 is sandwiched between a body member 22 and a cover member 21 which are main components making up the image stabilization apparatus 20 of the present embodiment. The image stabilization apparatus 20 of the present embodiment performs image stabilization by causing the fourth lens group 14a held by the fourth lens group holding member 14 to move within the XY plane orthogonal to the optical axis O of the image pickup optical system through action of an image stabilization drive unit 25 (see FIG. 4 or the like; including reference numerals 26y and 27y) which will be described later. That is, in the image stabilization apparatus 20 of the present embodiment, the fourth lens group holding member 14 is a movable barrel configured to hold some optical lenses of the image pickup optical system. The image stabilization drive unit 25 functions as a drive unit configured to drive the movable barrel (fourth lens group holding member 14) with respect to the fixed barrel (body member 22) (details will be described later).

Note that a high magnification zooming optical system (zoom lens) having optical magnification of, for example, approximately ×20 to ×30 is applied as the image pickup optical system of the camera unit 10. The image pickup optical system is not limited to this, but, for example, a fixed focus type optical system (e.g., fish-eye lens) may be applied or a variable focus type (varifocal lens) optical system may be applied. Certainly, a still higher magnification zooming optical system (zoom lens) such as optical magnification of ×50 may also be adopted.

An overview of the configuration of the camera unit 10 has been presented so far. Since various components of the camera unit 10 other than the aforementioned components, for example, the drive mechanism (not shown) contributing to an AF operation or a zoom operation and various electric parts including the diaphragm mechanism 18, the flexible printed circuit board 16 and the like are parts not directly related to the present invention, detailed description of the parts will be omitted because components similar to conventional, generally commercialized components are assumed to be applied to the parts.

Next, a configuration of the image stabilization apparatus 20 of the present embodiment will be described using mainly FIG. 4 to FIG. 6.

Figure 4:
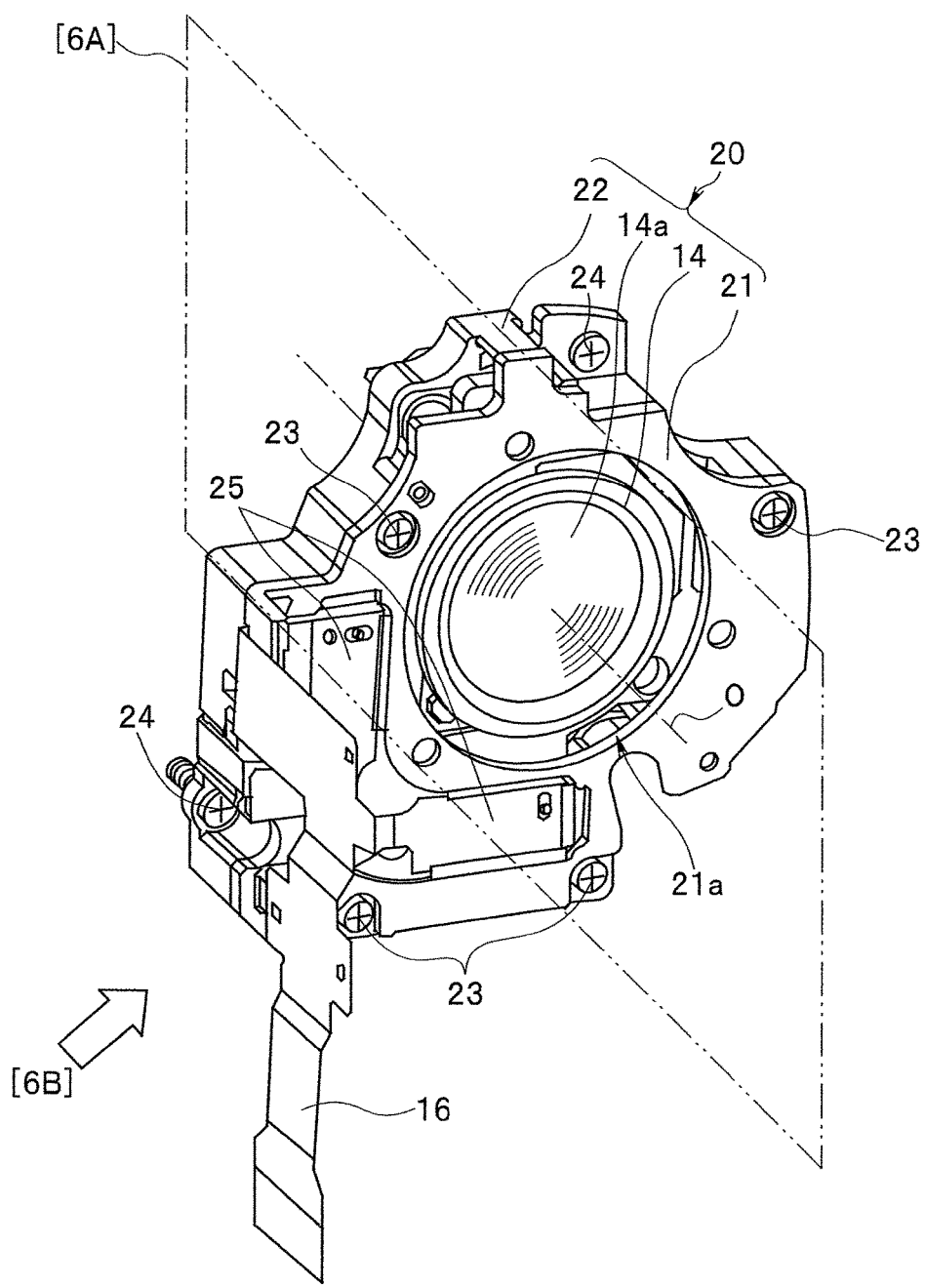
FIG. 4 is an external perspective view of an image stabilization apparatus of the present embodiment which is a principal component of the camera unit shown in FIG. 2 and FIG. 3, extracted from the camera unit.
Figure 5:
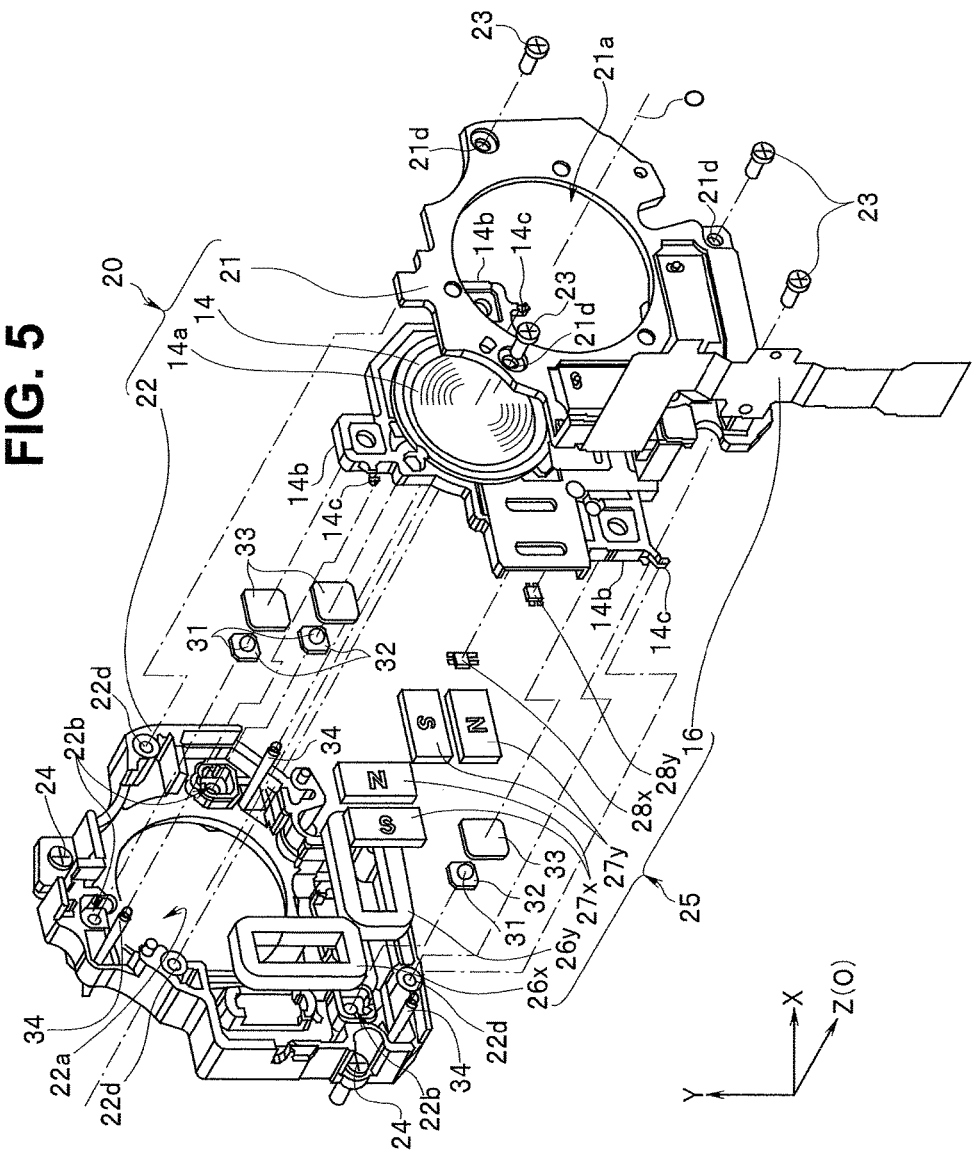
FIG. 5 is an exploded perspective view of the image stabilization apparatus in FIG. 4, taken to pieces.

FIG. 4 is an external perspective view of an image stabilization apparatus of the present embodiment which is a principal component of the camera unit shown in FIG. 2 and FIG. 3, extracted from the camera unit. FIG. 5 is an exploded perspective view of the image stabilization apparatus in FIG. 4, taken to pieces. FIG. 6 is a block configuration diagram illustrating main components of the image stabilization control section of the image stabilization apparatus according to the present embodiment. FIG. 7 is a diagram illustrating a specific example of data of self-diagnosis instruction values (moving target values) in the image stabilization apparatus of the present embodiment.

The image stabilization apparatus 20 according to the present embodiment is provided with a so-called lens shift type optical image stabilization mechanism configured to perform image stabilization by moving part of optical lenses making up the image pickup optical system within the XY plane orthogonal to the optical axis O of the image pickup optical system. Note that a basic configuration of the image stabilization apparatus 20 of the present embodiment is substantially similar to that of conventional image stabilization apparatuses of a similar type.

The image stabilization apparatus 20 of the present embodiment is mainly constructed of the body member 22, the cover member 21, the image stabilization drive unit 25, part of the optical lenses making up the image pickup optical system (fourth lens group 14a), the fourth lens group holding member 14 which is a movable barrel configured to hold the fourth lens group 14a, and the like.

The body member 22 is a basic component and a fixed barrel of the image stabilization apparatus 20. Based on the body member 22, various components are arranged and fixed at their respective predetermined positions. An opening 22a configured to pass an object light flux transmitting through the image pickup optical system is formed in a substantially central part of the body member 22.

The cover member 21 is disposed so as to cover one side of the body member 22 and provided to protect, fix and support the various components disposed between the body member 22 and the cover member 21. The cover member 21 is fixed to the body member 22 using, for example, a plurality of (four in the present embodiment) screws 23. For this purpose, a plurality of (four) screw insertion holes 21d are formed in the cover member 21. Correspondingly, a plurality of (four) screw holes 22d are formed in the body member 22 (see FIG. 5). An opening 21a configured to pass an object light flux transmitting through the image pickup optical system is formed in a substantially central part of the cover member 21.

When the body member 22 and the cover member 21 are fixed and assembled together using the screws 23 or the like in this way, the fourth lens group holding member 14 which is a movable barrel configured to hold the fourth lens group 14a is movably disposed within the XY plane orthogonal to the optical axis O between both members (the body member 22 and the cover member 21).

A substantially circular opening portion is formed in a substantially central part of the fourth lens group holding member 14 and the substantially circular fourth lens group 14a is disposed and fixed in the opening portion. The fourth lens group 14a is disposed at positions facing the opening 22a of the body member 22 and the opening 21a of the cover member 21 respectively.

In other words, the fourth lens group 14a, the body member 22 and the cover member 21 are disposed such that the optical axis O of the fourth lens group 14a, the substantially central axis of the opening 22a and the substantially central axis of the opening 21a all substantially coincide with each other.

As described above, the fourth lens group holding member 14 that holds the fourth lens group 14a to the body member 22 is a movable barrel configured to be movable within the XY plane orthogonal to the optical axis O of the image pickup optical system. For this reason, first of all, the body member 22 and the fourth lens group holding member 14 are coupled together via a plurality of (three in the present embodiment) taut urging springs 34. The plurality of urging springs 34 are stretched between the body member 22 and the fourth lens group holding member 14 to allow them to expand or contract in a direction parallel to the optical axis O so as to pull both members.

That is, the respective end portions of the urging springs 34 are hooked between a plurality of (three) spring hook portions 14c (see FIG. 5) formed at predetermined positions of the fourth lens group holding member 14 and the same number of (three) spring hook portions (not shown) provided in the body member 22 correspondingly. Thus, the fourth lens group holding member 14 which is a movable barrel is urged with respect to the body member 22 which is a fixed barrel in a direction along the optical axis O. In this condition, the fourth lens group holding member 14 has a degree of freedom that allows it to move within the XY plane orthogonal to the optical axis O.

With the fourth lens group holding member 14 (movable barrel) coupled with the body member 22 (fixed barrel) by being urged by the plurality of urging springs 34 in a direction parallel to the optical axis O, a plurality of (at least three) ceramic balls 31 are interposed between both members (the body member 22 and the fourth lens group holding member 14). The ceramic balls 31 are provided to smooth the movement of the fourth lens group holding member 14 with respect to the body member 22 within the plane XY orthogonal to the optical axis O. Here, the ceramic balls 31 function as support members to movably support the fourth lens group holding member 14 to the body member 22. Note that although the ceramic balls 31 are used to avoid influences of magnets in the present embodiment, if no influence of the magnets exists, the ceramic balls 31 may be substituted by steel balls.

Each ceramic ball 31 is disposed as follows. That is, a plurality of (three in the present embodiment) ball disposing portions 22b are formed at respective predetermined positions in an outer circumferential edge portion region of the opening 22a of the body member 22. Each of the ball disposing portions 22b is a support member disposing portion configured to form a housing space to rotatably house each of the ceramic balls 31 within a predetermined range and restrict an amount of movement of the ceramic balls 31 within the plane. A ball receiving plate 32 formed into a substantially rectangular shape using, for example, a metallic flat plate member such as stainless steel is disposed in a region which becomes a bottom surface portion of the ball disposing portion 22b, that is, the flat surface of the body member 22 (the XY plane orthogonal to the optical axis O), the surface that receives the ceramic ball 31. The body member 22 has a wall surface that extends from a peripheral edge portion toward a direction along the optical axis O so as to surround the ball receiving plate 32 (see FIG. 5 or the like). In this way, the ball disposing portion 22b forms a box-like shape with the bottom surface portion and the wall surface, with the surface opposite to the bottom surface portion being open.

On the other hand, as described above, when the fourth lens group holding member 14 is disposed so as to superimpose on the body member 22 at a predetermined normal position, the fourth lens group holding member 14 is provided with a plurality of (three in the present embodiment) ball receiving portions 14b formed at respective positions facing the plurality of (three in the present embodiment) ball disposing portions 22b respectively which are outer circumferential edge portion regions of the opening portion in which the fourth lens group 14a is disposed. Substantially rectangular ball receiving plates 33 using a metallic flat plate member or the like made of the same material as that of the ball receiving plates 32 are accommodated in the respective ball receiving portions 14b. The respective ball receiving plates 33 are arranged so as to cover the respective openings of the plurality of ball disposing portions 22b in this state (that is, a state in which the body member 22 and the fourth lens group holding member 14 are superimposed one on another at a predetermined normal position). In this case, one of the ceramic balls 31 is accommodated in each of the plurality of ball disposing portions 22b. With such a configuration, the ceramic ball 31 rotates while being sandwiched between the ball receiving plates 32 and 33 inside the ball disposing portion 22b. This makes the movement of the fourth lens group holding member 14 (movable barrel) smooth with respect to the body member 22 (fixed barrel) within the XY plane orthogonal to the optical axis O.

Note that a case has been described in the present embodiment where three ball disposing portions 22b and three ball receiving portions 14b are provided respectively. In this case, the ball disposing portions 22b and the ball receiving portions 14b are preferably arranged at substantially equal intervals in a circumferential direction around the central axis (that is, a virtual axis that coincides with the optical axis O) of the opening 22a. The present embodiment shows an example where the ball disposing portions 22b and the ball receiving portions 14b are provided at respective positions around the optical axis O at a substantially 120-degree interval.

Furthermore, for example, a pair of coils 26 (26x and 26y) which are members making up part of the image stabilization drive unit 25 are disposed and fixed in the outer circumferential edge region of the opening 22a of the body member 22.

Here, one coil (hereinafter called an "X coil") 26x of the pair of coils 26 (26x and 26y), is a member configured to contribute to the movement of the fourth lens group holding member 14 (movable barrel) in a direction along the X-axis and disposed along the X-axis. The other coil (hereinafter called a "Y coil") 26y of the pair of coils 26 (26x and 26y) is a member configured to contribute to the movement of the fourth lens group holding member 14 (movable barrel) in a direction along the Y-axis and disposed along the Y-axis.

Correspondingly, a pair of magnets 27x and 27y (see FIG. 5) are fixed at respective positions facing the pair of coils (26x and 26y) respectively on the fourth lens group holding member 14. That is, one pair of magnets 27x and 27y are disposed on each of coils 26x and 26y respectively. Each of the magnets 27x and 27y is formed in pairs. Each of the magnets 27x and 27y is disposed so that the magnet pole is oriented toward a predetermined direction.

Here, one magnet (hereinafter referred to as "X magnet") 27x of the pair of magnets 27x and 27y is a member configured to contribute to movement of the fourth lens group holding member 14 (movable barrel) in the direction along the X-axis in cooperation with the X coil 26x. The two magnets making up the X magnet 27x are arranged side by side so that their magnetic poles are reversed in the direction along the X-axis. The other magnet (hereinafter referred to as "Y magnet") 27y of the pair of magnets 27x and 27y is a member configured to contribute to the movement of the fourth lens group holding member 14 (movable barrel) in a direction along the Y-axis in cooperation with the Y coil 26y. The two magnets making up the magnet 27y are arranged side by side so that their magnetic poles are reversed in the direction along the Y-axis.

Furthermore, magnetic sensors 28x and 28y made of a hall element or the like (see FIG. 5) are disposed in the vicinity of the respective magnets 27 in the fourth lens group holding member 14. Among them, one magnetic sensor 28x is an X magnetic sensor configured to detect a magnetic pole change in the direction along the X-axis. The other magnetic sensor 28y is a Y magnetic sensor configured to detect a magnetic pole change in the direction along the Y-axis.

These magnets 27x and 27y, and magnetic sensors 28x and 28y are members making up the other part of the image stabilization drive unit 25. These magnets (27x and 27y) and magnetic sensors (28x and 28y) constitute position detection sections configured to detect positions within the plane (XY plane) within which the fourth lens group holding member 14 can move. Note that the position detection sections include a hall amplifier 56 and a position detection circuit 57 of an image stabilization control section (50x, 50y) which will be described later (see FIG. 6).

Thus, the image stabilization drive unit 25 includes the coils (26x and 26y), the magnets (27x and 27y), the magnetic sensors (28x and 28y) and the like.

The image stabilization apparatus 20 of the present embodiment also includes various components other than components described above, but such components are not directly related to the present invention, and so illustration and description of the components will be omitted.

The image stabilization apparatus 20 configured as described above is disposed and fixed at a predetermined position as part of the camera unit 10 as shown in FIG. 3. In this case, the image stabilization apparatus 20 is fixed to a predetermined fixed portion in the camera unit 10 using, for example, a plurality of screws 24 (three in the present embodiment; see FIG. 4 and FIG. 5).

Next, a schematic configuration of the image stabilization control section (50x, 50y) which becomes a main part of electrical components in the image stabilization apparatus 20 of the present embodiment will be described using FIG. 6. Note that the image stabilization apparatus 20 is denoted as an IS unit (IS stands for "image stabilization") in FIG. 6.

The image stabilization control section which is a control section configured to perform drive control on the image stabilization drive unit 25 which is a main part of the electrical components of the image stabilization apparatus 20 according to the present embodiment includes an X image stabilization control section 50x and a Y image stabilization control section 50y.

The X image stabilization control section 50x is configured to control a drive current to the X coil 26x with reference to the output from the X magnetic sensor 28x and thereby control the movement of the fourth lens group holding member 14 (movable barrel) in the direction along the X-axis. The Y image stabilization control section 50y is configured to control a drive current to the Y coil 26y with reference to the output from the Y magnetic sensor 28y and thereby control the movement of the fourth lens group holding member 14 (movable barrel) in the direction along the Y-axis. Note that the X image stabilization control section 50x and the Y image stabilization control section 50y are configured in completely the same way. For example, the image stabilization control section (50x, 50y) controls a drive current through pulse width modulation (PWM) that performs modulation by changing a duty ratio of pulse waves.

The X image stabilization control section 50x and the Y image stabilization control section 50y each include a gyro sensor 51, an image stabilization controller 52, a deviation calculator 53, a servo controller 54, a drive amplifier 55, a hall amplifier 56, a position detection circuit 57, a self-diagnosis instruction value controller 58, a self-diagnosis judgment controller 59 and the like.

The gyro sensor 51 is a detection sensor configured to detect shake vibration (apparatus shake) of the image pickup apparatus 1 (camera unit 10) provided with the image stabilization apparatus 20 by detecting an angular velocity and an angular acceleration. The shake vibration detection result from the gyro sensor 51 is outputted to the image stabilization controller 52.

The image stabilization controller 52 is a circuit section configured to calculate an image stabilization value for cancelling out the shake vibration based on an output signal from the gyro sensor 51, that is, a drive amount when driving the image stabilization apparatus (IS unit in FIG. 6) 20 for image stabilization. The drive amount calculation result from the image stabilization controller 52 is outputted to the deviation calculator 53.

Furthermore, at the same time, the deviation calculator 53 receives an output signal from the position detection circuit 57. That is, when the output signals from the magnetic sensors 28x and 28y of the image stabilization apparatus 20 are inputted to the hall amplifier 56 of the image stabilization control sections 50x and 50y, the hall amplifier 56 performs a signal amplification process in response to the signal input. The signal amplified by the hall amplifier 56 is outputted to the position detection circuit 57. Upon receiving the signal, the position detection circuit 57 detects a position corresponding to the body member 22 of the fourth lens group holding member 14 (fourth lens group 14a) within the XY plane orthogonal to the optical axis O. The detection result is outputted to the deviation calculator 53. Thus, the hall amplifier 56 and the position detection circuit 57 constitute part of the position detection section.

The deviation calculator 53 is a circuit section configured to perform a deviation calculation based on the output signal from the image stabilization controller 52 and the output signal from the position detection circuit 57 (details will be described later) and generate a drive signal to the image stabilization apparatus 20. The calculation result from the deviation calculator 53 is outputted to the servo controller 54.

The servo controller 54 is a calculation circuit section configured to receive the output signal from the deviation calculator 53 and generate a drive control signal of the image stabilization apparatus 20, that is, a drive control signal for driving the fourth lens group holding member 14 (fourth lens group 14a) to a target position (image stabilization position for canceling out shake vibration). The servo controller 54 is made up of, for example, a microcontroller. The drive control signal generated by the servo controller 54 is outputted to the drive amplifier 55.

The drive amplifier 55 is an amplification circuit configured to receive the drive control signal from the servo controller 54 and amplify the drive control signal. The drive amplifier 55 includes, for example, a PWM drive circuit. The signal amplified by the drive amplifier 55 is sent to the image stabilization drive unit 25 (see FIG. 5 or the like) to perform predetermined drive control, for example, drive the coils 26x and 26y with a predetermined drive current.

In this way, the image stabilization apparatus 20 is driven (a predetermined drive current is caused to flow through the coils 26x and 26y) and the fourth lens group holding member 14 (fourth lens group 14a) moves within the movable plane. At this time, the position of the fourth lens group holding member 14 (fourth lens group 14a) is detected by the magnetic sensors 28x and 28y and position information of the fourth lens group holding member 14 is inputted to the deviation calculator 53 again via the position detection circuit 57. The predetermined calculation is performed by the deviation calculator 53 and the calculation result is outputted to the servo controller 54. The servo controller 54 generates a drive control signal of the image stabilization apparatus 20 and drives and controls the image stabilization drive unit 25 of the image stabilization apparatus 20 according to the drive control signal.

Thus, the image stabilization apparatus 20 performs feedback control by comparing the drive amount calculation result from the image stabilization controller 52 with the position detection result of the current position detected by the position detection circuit 57, and at the same time performing image stabilization. The aforementioned configuration and control of the image stabilization apparatus 20 according to the present embodiment are substantially similar to a configuration and control of a conventional and general image stabilization apparatus.

On the other hand, the image stabilization apparatus 20 of the present embodiment includes a self-diagnosis mode in which the image stabilization apparatus 20 executes a preset series of defined operations at preset timings to thereby confirm and judge whether or not the image stabilization apparatus 20 itself operates normally, whether or not a fault or abnormality has occurred or whether or not a malfunction has occurred or further what extent the deterioration condition reaches when the image stabilization apparatus 20 operates normally.

Timing of executing an operation in the self-diagnosis mode is, more specifically, every specified time every day or a predetermined time interval (e.g., every specified time interval such as every 24 hours or every week). Timing of executing an operation of the image stabilization apparatus 20 in the self-diagnosis mode is controlled through programming in the control section of the terminal apparatus that controls the image pickup apparatus 1 provided with the image stabilization apparatus 20.

Furthermore, the series of defined operations set in advance in the self-diagnosis mode include, for example, driving the image stabilization apparatus 20, moving the fourth lens group holding member 14 (fourth lens group 14a) to a specified target position, confirming whether or not the target position can be maintained or continuing what is the level of deviation when maintaining the target position and determining the condition of the image stabilization apparatus 20.

Figure 6:
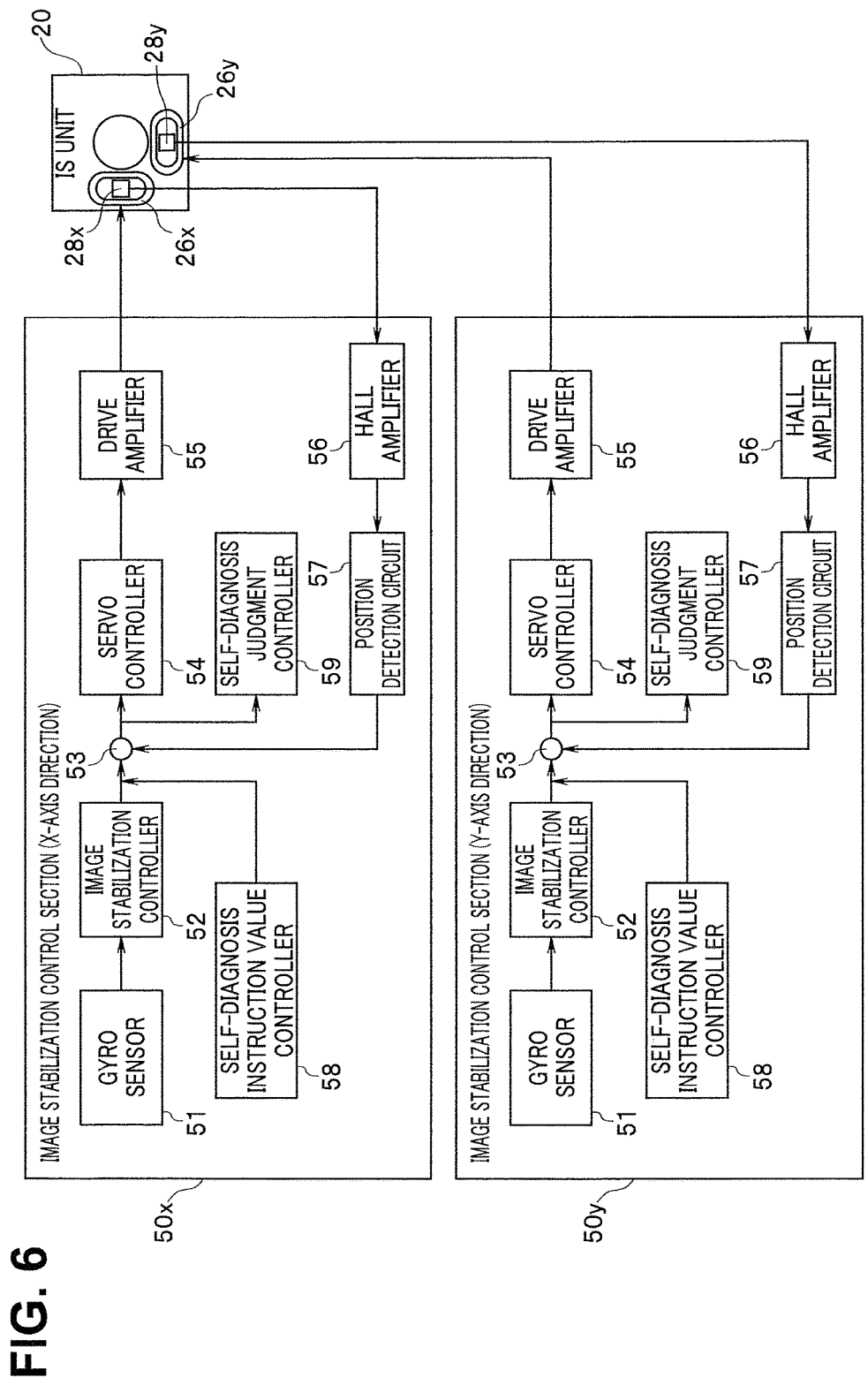
FIG. 6 is a block configuration diagram illustrating main components of the image stabilization control section of the image stabilization apparatus according to the present embodiment.
Figure 7:
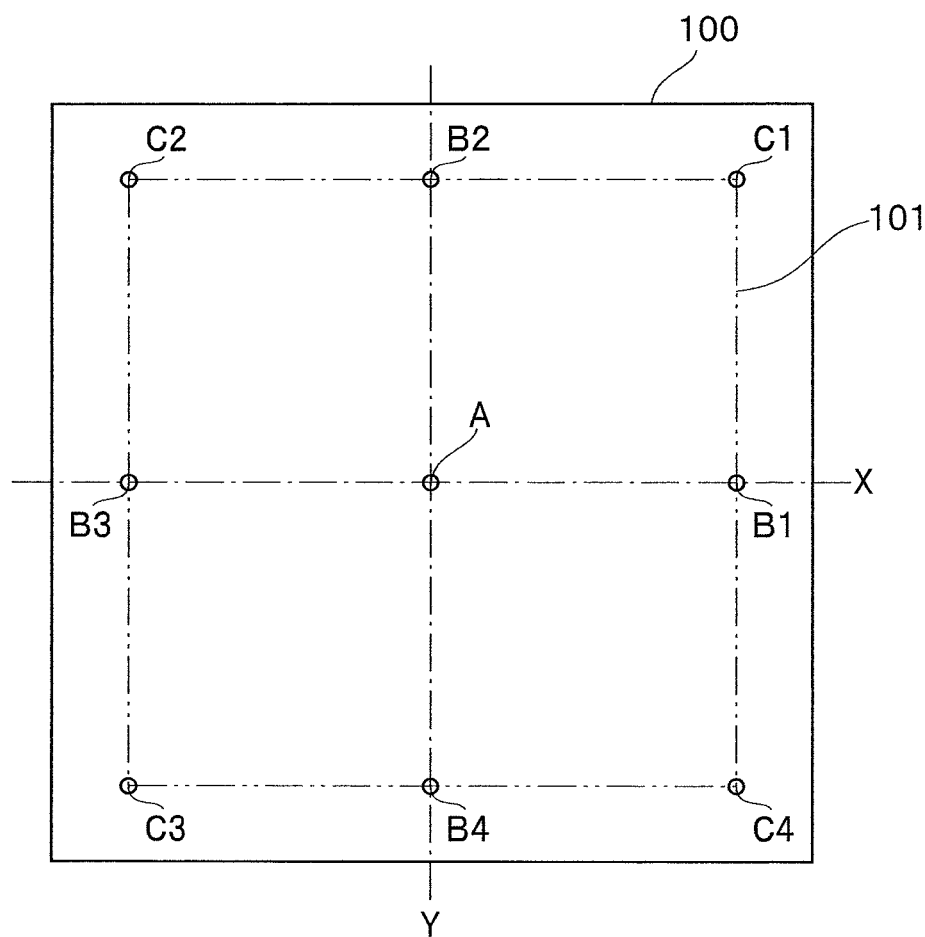
FIG. 7 is a diagram illustrating a specific example of data of self-diagnosis instruction value (moving target value) in the image stabilization apparatus of the present embodiment.

For that reason, the image stabilization apparatus 20 according to the present embodiment includes the self-diagnosis instruction value controller 58 and the self-diagnosis judgment controller 59 as shown in FIG. 6 and as described above.

The self-diagnosis instruction value controller 58 is a circuit section configured to output a self-diagnosis instruction value to the deviation calculator 53 when the image stabilization apparatus 20 operates in the self-diagnosis mode. Here, the self-diagnosis instruction value is a moving target value indicating a target position when moving the movable barrel.

The self-diagnosis judgment controller 59 is a circuit section that functions as a judgment section configured to receive, when the image stabilization apparatus 20 operates in the self-diagnosis mode, output from the deviation calculator 53, that is, the calculation result (deviation) from the deviation calculator 53 and data of the instruction values from the self-diagnosis instruction value controller 58 and judge the operation condition of the image stabilization apparatus 20.

More specifically, once the image pickup apparatus 1 (camera unit 10) starts operating in the self-diagnosis mode, an instruction value for instructing the drive to a predetermined position (e.g., center position) is outputted from the self-diagnosis instruction value controller 58 first. The instruction signal is outputted to the servo controller 54 via the deviation calculator 53. The servo controller 54 generates a drive control signal corresponding to the instruction signal and drives and controls the image stabilization drive unit 25 according to the instruction signal.

The position detection circuit 57 detects the position of the fourth lens group holding member 14 (fourth lens group 14a) based on the detection signals of the magnetic sensors 28x and 28y and outputs the detection position information to the deviation calculator 53. In this way, the position detection circuit 57 constitutes part of the position detection section.

The deviation calculator 53 calculates a deviation based on the instruction value and the detection position information and outputs the calculation result to the self-diagnosis judgment controller 59. Upon receiving the calculation result, the self-diagnosis judgment controller 59 receives the output from the deviation calculator 53 and data of the instruction values from the self-diagnosis instruction value controller 58, and diagnoses and judges the condition of itself. The judgment result is outputted from the image stabilization control section (50x and 50y) to a control section (not shown) of the camera unit 10.

Here, data of the self-diagnosis instruction values are XY coordinates or the like that specify any point on the X-Y plane, for example. The self-diagnosis instruction value takes, more specifically, data as shown in FIG. 7. FIG. 7 is a diagram illustrating a specific example of data (moving target value) of the self-diagnosis instruction value in the image stabilization apparatus of the present embodiment.

In FIG. 7, a region enclosed by a solid line denoted by reference numeral 100 indicates a range within which the fourth lens group holding member 14 (fourth lens group 14a) of the image stabilization apparatus 20 can mechanically move within the XY plane orthogonal to the optical axis O. A region enclosed by a two-dot dashed line denoted by reference numeral 101 indicates a correction drive range where the image stabilization apparatus 20 is caused to operate for image stabilization. Here, the correction drive range 101 is located inside the movement drive range 100. This is intended to secure the correction drive range 101 in consideration of mechanical variations in machining accuracy of the movable barrel or the like in the image stabilization apparatus 20, for example.

Furthermore, reference character A denotes a central point of the fourth lens group 14a, that is, a point coinciding with the optical axis O. During a startup of the image pickup apparatus 1 (camera unit 10) to which the image stabilization apparatus 20 is applied, the image stabilization apparatus 20 is driven and controlled so that the central point (optical axis O) of the fourth lens group 14a always coincides with reference character A. From this, the position denoted by reference character A is assumed to be called "reference specified position."

Reference numerals B1 to B4 are examples of target points on the X-axis and the Y-axis within the movement drive range 100. In this case, for example, when the optical axis O is moved, for example, from the position denoted by reference character A to the position denoted by reference numeral B1 or the position denoted by reference numeral B3, the X image stabilization control section 50x is controlled. Since the Y-axis does not move, the Y image stabilization control section 50y performs control to hold the position. Similarly, when the optical axis O is moved, for example, from the position denoted by reference character A to the position denoted by reference numeral B2 or the position denoted by reference numeral B4, the Y image stabilization control section 50y is controlled and the X image stabilization control section 50x performs control to hold the position.

Reference numerals C1 to C4 are examples where target points are set at substantially four corner positions inside the movement drive range 100. In this case, in order to move the optical axis O to any one of the positions denoted by reference numerals C1 to C4 from the position denoted by reference character A, it is necessary to control both the X image stabilization control section 50x and the Y image stabilization control section 50y.

Operation becomes tougher when a position more distant from the central point is set as the moving target point in the self-diagnosis mode or when both the X-axis and the Y-axis are driven more frequently. This is because performance of the drive mechanism is generally best at the center and performance deteriorates as the distance from the center increases. Therefore, the degree of strictness of diagnostic criteria can be set by selecting a moving target point when causing the image stabilization apparatus 20 to operate in the self-diagnosis mode.

The rest of the configuration is substantially similar to the configuration of the conventional image stabilization apparatus. Therefore, the configuration other than that described above is not directly related to the present invention, and so illustration and detailed description of the configuration will be omitted.

Next, operation in the self-diagnosis mode of the image stabilization apparatus of the present embodiment will be described below using FIG. 8 to FIG. 13.

Figure 8:
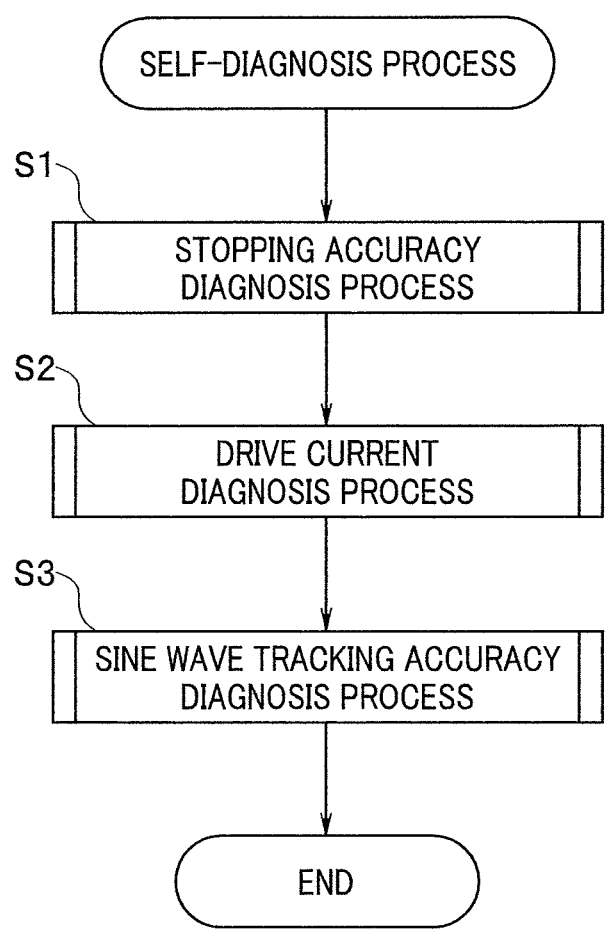
FIG. 8 is a main flowchart illustrating a processing sequence in a self-diagnosis mode in the image stabilization apparatus of the present embodiment.
Figure 9:
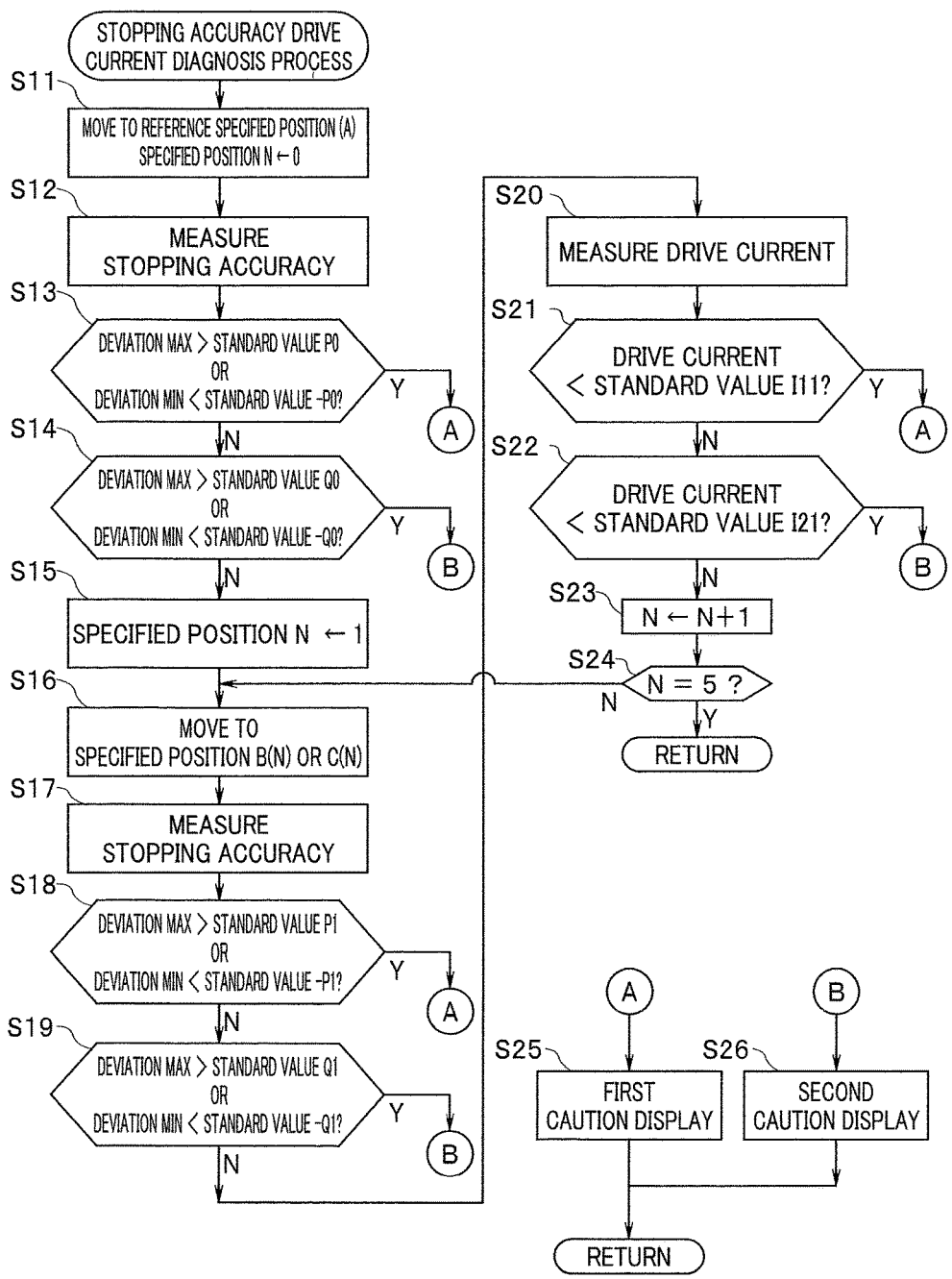
FIG. 9 is a flowchart illustrating a detailed processing sequence of a stopping accuracy diagnosis process (step S1) and a drive current diagnosis process (step S2) in FIG. 8.
Figure 11:
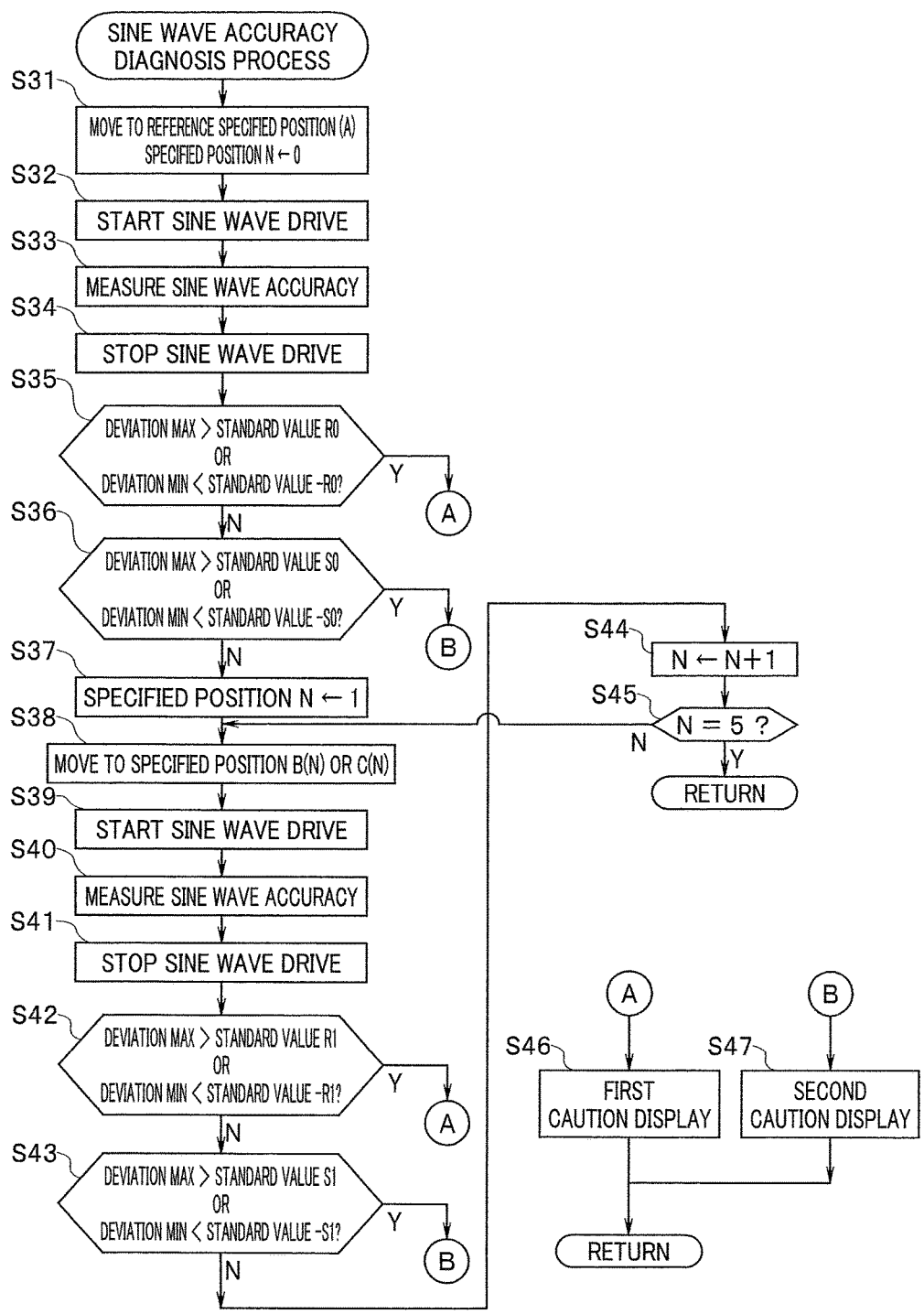
FIG. 11 is a flowchart illustrating a detailed processing sequence of a sine wave tracking accuracy diagnosis process in FIG. 8 (step S3)

FIG. 8, FIG. 9 and FIG. 11 are flowcharts illustrating a processing sequence in the self-diagnosis mode of the image stabilization apparatus of the present embodiment. Among them, FIG. 8 is a main flowchart illustrating a processing sequence in the self-diagnosis mode. FIG. 9 is a flowchart illustrating a detailed processing sequence of a stopping accuracy diagnosis process (step S1) and a drive current diagnosis process (step S2) in FIG. 8. FIG. 11 is a flowchart illustrating a detailed processing sequence of a sine wave tracking accuracy diagnosis process in FIG. 8 (step S3).

Figure 10:
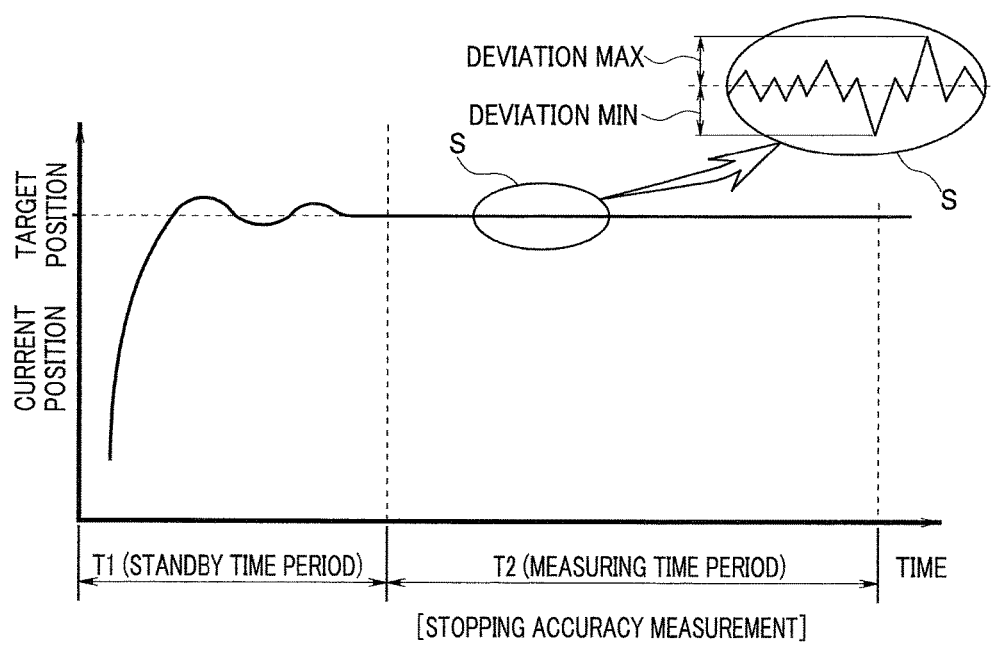
FIG. 10 is a diagram illustrating the stopping accuracy diagnosis process in FIG. 9 (process in step S1 in FIG. 8)
Figure 12:
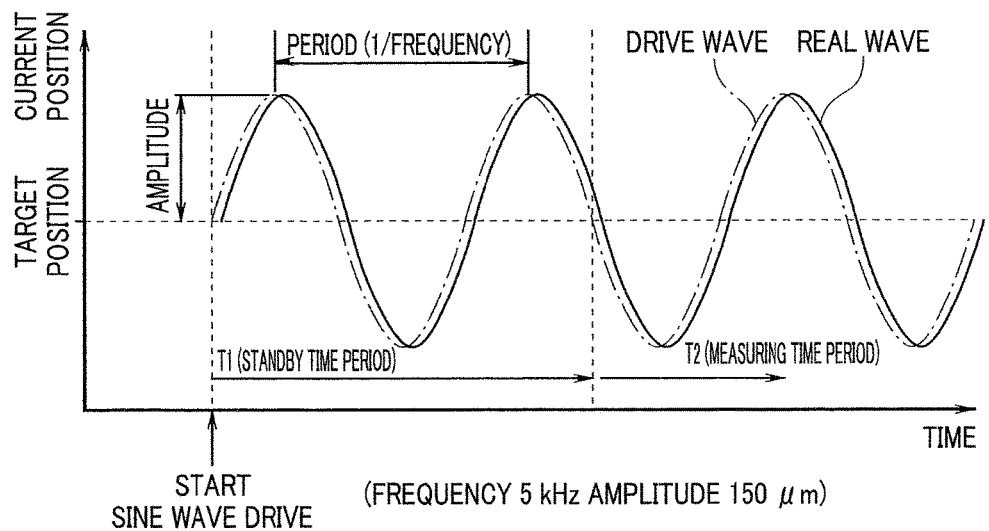
FIG. 12 is a diagram illustrating the sine wave tracking accuracy diagnosis process in FIG. 11 (process in step S3 in FIG. 8)
Figure 13:
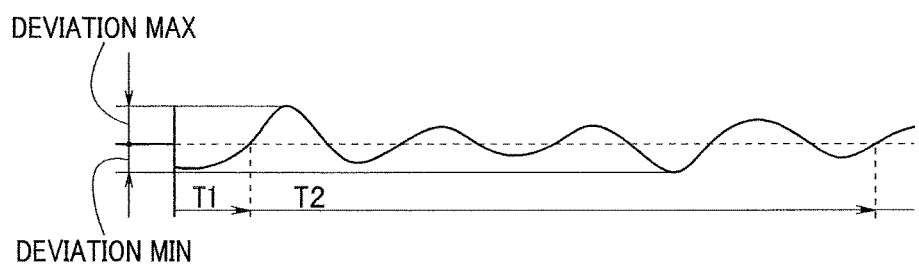
FIG. 13 is a diagram illustrating a waveform of a deviation between a drive wave and a real vibration wave shown in FIG. 12.

Note that FIG. 10, FIG. 12 and FIG. 13 are diagrams illustrating the respective processing sequences shown by the respective flowcharts in FIG. 9 and FIG. 11. Among them, FIG. 10 is a diagram illustrating the stopping accuracy diagnosis process in FIG. 9 (process in step S1 in FIG. 8). FIG. 12 is a diagram illustrating the sine wave tracking accuracy diagnosis process in FIG. 11 (process in step S3 in FIG. 8). FIG. 13 is a diagram illustrating a waveform of a deviation between a drive wave and a real vibration wave shown in FIG. 12.

When the image stabilization apparatus 20 of the present embodiment operates in the self-diagnosis mode, the stopping accuracy diagnosis process in step S1, the drive current diagnosis process in step S2 and the sine wave tracking accuracy diagnosis process in step S3 are sequentially executed as shown in FIG. 8.

In the stopping accuracy diagnosis process shown in step 1 in FIG. 8, the image stabilization control section (50x, 50y) performs a process of moving the central point of the fourth lens group 14a to a reference specified position (reference character A in FIG. 7) first in step S11 as shown in FIG. 9. Here, a variable N=0 indicating the specified position is set simultaneously. Then, the flow proceeds to a process in step S12.

That is, the image stabilization control section (50x, 50y) causes the self-diagnosis instruction value controller 58 to output instruction values indicating a reference specified position corresponding to the variable N=0 indicating the specified position ((x0, y0) expressed by (x coordinate, y coordinate) (reference character A in FIG. 7)). The instruction value signal is inputted to the servo controller 54 via the deviation calculator 53. The servo controller 54 receives the instruction value signal, generates a drive control signal corresponding to the inputted instruction value signal, and drives and controls the image stabilization drive unit 25 of the image stabilization apparatus 20 according to the drive control signal. Then, the flow waits for a predetermined time period (a first defined time period T1) until the fourth lens group 14a becomes stable. At this time, the position detection circuit 57 detects the position of the fourth lens group 14a based on the detection signals of the magnetic sensors 28x and 28y and inputs the detection position information to the deviation calculator 53. The deviation calculator 53 calculates a deviation based on the instruction value and the detection position information and outputs the calculation result to the servo controller 54. Upon receiving the calculation result, the servo controller 54 newly generates a drive control signal corresponding to the inputted instruction value signal and drives and controls the image stabilization drive unit 25 (repeated hereinafter).

The situation at this time is a standby time period (first defined time period) indicated by reference numeral T1 in FIG. 10. A diagram shown in FIG. 10 is a diagram illustrating a fluctuation of the current position of the fourth lens group 14a detected by the magnetic sensors 28x and 28y and the position detection circuit 57. FIG. 10 shows that during an initial period of drive, that is, during a standby time period T1, the current position of the driven fourth lens group 14a fluctuates toward a target position (reference specified position A in this case), and the fluctuation is not stable. When the standby time period T1 elapses, the fourth lens group 14a becomes stable. The flow then proceeds to a process in next step S12 in FIG. 9.

In step S12, the image stabilization control section (50x, 50y) executes a stopping accuracy measurement process. The process is executed during a measuring time period (second defined time period) shown by reference numeral T2 shown in FIG. 10. During the period of the measuring time period T2, fluctuations at the target position (reference specified position A in this case) and at the current position are stable as shown in FIG. 10 and both apparently coincide with each other. However, as shown in an enlarged view shown by reference character S in FIG. 10, minute fluctuations are actually observed. Thus, the stopping accuracy measurement process executed in step S12 is a process of measuring a maximum value (deviation MAX) and a minimum value (deviation MIN) of the minute fluctuations. The process is obtained by calculating a deviation based on the detection position information signal (current position information) from the position detection circuit 57 and the instruction value signal in the deviation calculator 53. The "deviation MAX" and "deviation MIN" calculated here are outputted to the self-diagnosis judgment controller 59.

Next, in step S13 in FIG. 9, the image stabilization control section (50x, 50y) compares the "deviation MAX" and the "deviation MIN" calculated in the process in aforementioned step S12 with a predetermined standard value ±P0. Here, the standard value ±P0 is a standard value to be diagnostic criteria indicative of whether or not the image stabilization apparatus 20 operates normally. That is, the standard value P0 can be said to indicate an allowable range of normal operation in the image stabilization apparatus 20 (hereinafter the same will apply to a standard value). The data of standard values is stored in advance, for example, in the self-diagnosis judgment controller 59. In addition, data of the standard values may be stored in advance in a storage medium provided in another region in the image stabilization apparatus 20 and may be read as appropriate when the process in step S13 is performed. In the present embodiment, more specifically, the standard value ±P0 is assumed to be, for example, ±P0=±8 μm.

In the process in step S13 above, when the self-diagnosis judgment controller 59 confirms that the "deviation MAX>standard value P0" or "deviation MN<standard value −P0," the image stabilization control section (50x, 50y) outputs the judgment result to a control section (not shown) of the camera unit 10. The flow then proceeds to a process in step S25. Note that (deviation MAX)−(deviation MIN) may be calculated using the deviation MAX and the deviation MIN and may be compared with corresponding standard P0'.

In step S25, the control section (not shown) of the camera unit 10 transmits the judgment result from the image stabilization apparatus 20 to the terminal apparatus (not shown) connected via communication means (not shown) such as of the wired cable or wireless or via a network (not shown). Upon receiving the judgment result, the terminal apparatus (not shown) executes a process of displaying a "first caution display" on a display screen of an image display apparatus (not shown). Then, a series of processes is ended and the flow returns to the original process (return).

Specific examples of the "first caution display" displayed here include a caution display indicating that some abnormality has occurred in the image stabilization apparatus 20 of (the camera unit 10 of) the image pickup apparatus 1 and repair or maintenance is required, or a warning display announcing that a problem or a malfunction has occurred or that a repair or replacement time is approaching.

On the other hand, in the process in step S13 above, when the self-diagnosis judgment controller 59 confirms that "deviation MAX>standard value P0" or "deviation MIN<standard value −P0" is not true, the image stabilization control section (50*x*, 50*y*) proceeds to a processing in next step S14.

In step S14, the image stabilization control section (50*x*, 50*y*) compares the "deviation MAX" and "deviation MIN" calculated in the aforementioned process in step S12 with a predetermined standard value ±Q0 which is different from the above standard value ±P0. Here, the standard value ±Q0 is assumed to be a standard value to be diagnostic criteria when the allowable error is relaxed although the image stabilization apparatus 20 operates normally. Therefore, a value that leads to "standard value P0>standard value ±Q0 is set. In the present embodiment, more specifically, standard value ±Q0 is assumed to be, for example, ±Q0=±5 μm.

Note that the data of the standard value ±Q0 is stored in advance in another storage medium or the like in the self-diagnosis judgment controller 59 or the image stabilization apparatus 20 and the data is read as appropriate when the process in step S14 is performed.

In the process in step S14, when the self-diagnosis judgment controller 59 confirms that "deviation MAX>standard value Q0" or "deviation MIN<standard value −Q0", the image stabilization control section (50*x*, 50*y*) outputs the judgment result to the control section (not shown) of the camera unit 10. Then, the flow proceeds to a process in step S26.

In step S26, the control section (not shown) of the camera unit 10 transmits the judgment result from the image stabilization apparatus 20 to a terminal apparatus (not shown) connected via communication means (not shown) such as of the wired cable or wireless or via a network (not shown). Upon receiving the judgment result, the terminal apparatus (not shown) executes a process of displaying a "second caution display" on a display screen of an image display apparatus (not shown). Then, a series of processes is ended and the flow returns to the original process (return).

Specific examples of the "second caution display" displayed here include a caution display indicating that although no abnormality has occurred at present in the image stabilization apparatus 20 of (the camera unit 10 of) the image pickup apparatus 1, a repair or maintenance will be required in the near future, a predictive warning display suggesting a possibility of an abnormality or malfunction occurring in the near future.

On the other hand, in the process in step S14 above, when the self-diagnosis judgment controller 59 confirms that "deviation MAX>standard value Q0" or "deviation MIN<standard value −Q0" is not true, the image stabilization control section (50*x*, 50*y*) proceeds to a process in next step S15.

In step S15, the image stabilization control section (50*x*, 50*y*) sets a variable N indicating the specified position to N=1. In this case, if the specified position is moved from the reference specified position A to the reference numeral B(N), target position B(N) becomes B(N)=B1. Similarly, if the specified position is moved from the reference specified position A to the reference numeral C(N), target position C(N) becomes C(N)=C1.

Next, in step S16, the image stabilization control section (50*x*, 50*y*) performs control so as to move the central point of the fourth lens group 14*a* to a specified position corresponding to variable N=1 indicating the specified position (e.g., coordinates (x1, y0) when the target position is assumed to be reference numeral B1 in FIG. 7 or coordinates (x1, y1) when the target position is assumed to be reference numeral C1 in FIG. 7). The process is substantially similar to the aforementioned process in step S11. Then, the flow proceeds to a process in step S17.

Next, in step S17, the image stabilization control section (50*x*, 50*y*) performs a stopping accuracy measurement process. The process is substantially similar to the aforementioned process in step S12. Then, the flow proceeds to a process in step S18.

In step S18, the image stabilization control section (50*x*, 50*y*) compares the "deviation MAX" and the "deviation MIN" calculated in the aforementioned process in step S17 with the predetermined standard value ±P1. As in the case of the standard value ±P0, the standard value ±P1 is a standard value to be diagnostic criteria indicative of whether or not the image stabilization apparatus 20 operates normally. Data of the standard value ±P1 is also stored in advance, for example, in another storage medium in the self-diagnosis judgment controller 59 or in the image stabilization apparatus 20 and is read as appropriate when performing the process in step S18.

In general, the drive accuracy tends to decrease as the amount of movement increases, that is, as the image stabilization apparatus 20 moves toward peripheral regions apart from the central region. Therefore, regarding a reference value of stopping accuracy, the drive accuracy of movement toward the peripheral regions may be set to be slightly lower than the drive accuracy in the central region. In the present embodiment, for example, when the stopping accuracy standard value ±P0 at the reference specified position A is assumed to be ±P0=±8 μm, the stopping accuracy standard value ±P1 for the movement toward the peripheral region (target value B1, C1 or the like) from the reference specified position A may be set to ±P1=±10 μm or the like. The process is substantially similar to the aforementioned process in step S13.

That is, in the process in step S18, when the self-diagnosis judgment controller 59 confirms that "deviation MAX>standard value P1" or "deviation MIN<standard value −P1," the image stabilization control section (50*x*, 50*y*) outputs the judgment result to the control section (not shown) of the camera unit 10. Then, the flow proceeds to a process in step S25.

In step S25, the control section (not shown) of the camera unit 10 transmits the judgment result from the image stabilization apparatus 20 to the terminal apparatus (not shown). The terminal apparatus (not shown) that receives the judgment result displays a "first caution display" on a display screen of an image display apparatus (not shown). Then, a series of processes is ended and the flow returns to the original process (return).

On the other hand, in the process in step S18, when the self-diagnosis judgment controller 59 confirms that "deviation MAX>standard value P1" or "deviation MIN<standard value −P1" is not true, the image stabilization control section (50*x*, 50*y*) proceeds to the next step S19.

In step S19, the image stabilization control section (50x, 50y) compares the "deviation MAX" and the "deviation MIN" calculated in the aforementioned process in step S17 with a predetermined standard value ±Q1 which is different from the above standard value ±P1. Here, the standard value ±Q1 is assumed to be a standard value to be diagnostic criteria when an allowable error is relaxed although the image stabilization apparatus 20 operates normally (standard value P1>standard value Q1) as in the case of the standard value ±Q0. Since the standard value ±Q1 is a reference value of stopping accuracy of the peripheral region, the standard value ±Q1 is set to be slightly lower than the standard value ±Q0 which is a reference value of the stopping accuracy in the central region. In the present embodiment, for example, when the standard value ±Q0 is assumed to be ±Q0=±5 μm, the standard value ±Q1 may be set to ±Q1=±8 μm or the like. The process is substantially similar to the aforementioned process in step S14.

Note that data of the standard value ±Q1 is also stored in advance in another storage medium or the like in the self-diagnosis judgment controller 59 or in the image stabilization apparatus 20 and is read as appropriate when performing the process in step S19.

In the process in step S19, when the self-diagnosis judgment controller 59 confirms that "deviation MAX>standard value Q1" or "deviation MIN<standard value −Q1," the image stabilization control section (50x, 50y) outputs the judgment result to the control section (not shown) of the camera unit 10. Then, the flow proceeds to a process in step S26.

In step S26, the control section (not shown) of the camera unit 10 transmits the judgment result from the image stabilization apparatus 20 to the terminal apparatus (not shown). The terminal apparatus (not shown) that receives the judgment result performs a process of displaying a "second caution display" on a display screen of an image display apparatus (not shown). Then, a series of processes is ended and the flow returns to the original process (return).

On the other hand, in the process in step S19, when the self-diagnosis judgment controller 59 confirms that "deviation MAX>standard value Q1" or "deviation MIN<standard value −Q1" is not true, the image stabilization control section (50x, 50y) proceeds to the next step S20.

In step S20, the image stabilization control section (50x, 50y) executes a drive current measurement process. The drive current measurement process is a process of, for example, confirming output of the drive amplifier 55. More specifically, for example, a drive duty of the servo controller 54 is detected. Therefore, in this case, the image stabilization control section (50x, 50y) functions as drive current detection means. It is understandable here that the greater the drive current, the greater the amount of movement of the movable barrel becomes. Then, the flow proceeds to a process in step S21.

In step S21, the image stabilization control section (50x, 50y) compares the drive current measurement result of the aforementioned drive current measurement process in step S20 with a predetermined standard value I11. Here, the standard value I11 is a standard value to be diagnostic criteria indicative of whether or not the image stabilization apparatus 20 operates normally. Data of the standard value is also stored in advance in, for example, another storage medium or the like in the self-diagnosis judgment controller 59 or in the image stabilization apparatus 20 and is read as appropriate when performing the process in step S20.

Upon confirming in the process in step S21 that "drive current<standard value I11," image stabilization control section (50x, 50y) outputs the judgment result to the control section (not shown) of the camera unit 10. Then, the flow proceeds to a process in step S25.

In step S25, the control section (not shown) of the camera unit 10 transmits the judgment result from the image stabilization apparatus 20 to the terminal apparatus (not shown). The terminal apparatus (not shown) that receives the judgment result displays a "first caution display" on a display screen of an image display apparatus (not shown). Then, a series of processes is ended and the flow returns to the original process (return).

On the other hand, when it is confirmed in the process in step S21 that "drive current<standard value I11" is not true, the image stabilization control section (50x, 50y) outputs the judgment result to the control section (not shown) of the camera unit 10. Then, the flow proceeds to a process in step S22.

In step S22, the image stabilization control section (50x, 50y) compares the drive current measurement result calculated in the aforementioned process in step S20 with a predetermined standard value I21 which is different from the standard value I11. Here, the standard value I21 is assumed to be a standard value to be diagnostic criteria when an allowable error is relaxed although the image stabilization apparatus 20 operates normally (standard value I11>standard value I21).

Note that data of the standard value I21 is also stored in advance in, for example, another storage medium or the like in the self-diagnosis judgment controller 59 or in the image stabilization apparatus 20 and is read as appropriate when performing the process in step S22.

When it is confirmed in the process in step S22 that "drive current>standard value I21," image stabilization control section (50x, 50y) outputs the judgment result to the control section (not shown) of the camera unit 10. Then, the flow proceeds to a process in step S26.

In step S26, the control section (not shown) of the camera unit 10 transmits the judgment result from the image stabilization apparatus 20 to the terminal apparatus (not shown). The terminal apparatus (not shown) that receives the judgment result performs a process of displaying a "second caution display" on a display screen of an image display apparatus (not shown). Then, a series of processes is ended and the flow returns to the original process (return).

On the other hand, when it is confirmed in the process in step S22 that "drive current>standard value I21" is not true, the image stabilization control section (50x, 50y) proceeds to a process in next step S23.

In step S23, the image stabilization control section (50x, 50y) increments variable N of a specified position to (N+1) and proceeds to next step S24.

In step S24, the image stabilization control section (50x, 50y) confirms whether or not variable N=5 at the specified position. N=5 is confirmed here to measure accuracy in the self-diagnosis mode at a reference specified position (reference character A in FIG. 7) and four specified positions (reference numerals B1 to B4 or reference numerals C1 to C4 in FIG. 7). Therefore, the number of measurement specified positions is not limited to this. When incrementing or decrementing specified positions, a numerical value to be substituted into variable N may be operated in the process in step S24.

When N=5 in the process in step S24, a series of processes is ended and the flow returns to the original process (return). Furthermore, when N=5 is not confirmed, the flow returns to the process in step S16 and repeats the subsequent processes.

When the flow ends the processing sequence in FIG. 9 and returns to FIG. 8, a sine wave tracking accuracy diagnosis process in next step S3 in FIG. 8 is executed. Details of the sine wave tracking accuracy diagnosis process are as shown in FIG. 11.

First, in step S31 in FIG. 11, the image stabilization control section (50x, 50y) performs a process of moving the central point of the fourth lens group 14a to the reference specified position (reference character A in FIG. 7). Here, a variable N indicating the specified position is set to N=0 simultaneously. The process in step S31 is similar to the process in step S11 in FIG. 9. Then, the flow proceeds to a process in step S32.

In step S32, the image stabilization control section (50x, 50y) controls the self-diagnosis instruction value controller 58 to generate a sine wave, thereby starts a sine wave drive to drive the fourth lens group 14a. At this time, the fourth lens group 14a is located at a specified position (located at the reference specified position A at the current point in time) by the aforementioned process in step S31. Therefore, when the sine wave drive is started in step S32, the fourth lens group 14a vibrates centered on a specified position (reference specified position A at the current point in time). After the sine wave drive is started, the flow waits for the predetermined time period T1 to elapse. Then, the flow proceeds to a process in step S33.

Note that in order for the self-diagnosis instruction value controller 58 to generate a drive sine wave through the process in step S32, for example, table data stored in advance in another storage medium or the like in itself (self-diagnosis instruction value controller 58) or in the image stabilization apparatus 20 is referenced or the self-diagnosis instruction value controller 58 itself calculates trigonometric functions through an internal calculation circuit.

Here, the diagram shown in FIG. 12 is a diagram illustrating fluctuations of the current position of the fourth lens group 14a detected by the magnetic sensors 28x and 28y, and the position detection circuit 57. Reference numeral T1 shown in FIG. 12 is the above-described predetermined time period T1 and is a standby time period T1 after a drive start and before a measurement start. In the present processing sequence, the flow waits accuracy measurement for an initial period of drive shown in FIG. 12, that is, the standby time period T1 and starts the sine wave tracking accuracy measurement process (process in step S33 in FIG. 11) after a lapse of the standby time period T1. As shown in FIG. 12, the real vibration (displacement of the current position) by the sine wave drive occurs slightly later than the supplied sine wave (drive wave).

In step S33, the image stabilization control section (50x, 50y) controls the deviation calculator 53 and executes a sine wave tracking accuracy measurement process. The measurement process is obtained by calculating a deviation based on the detection position information signal (current position information of the fourth lens group 14a which is a real wave) from the position detection circuit 57 and a drive sine wave (instruction value) outputted from the self-diagnosis instruction value controller 58. The result is as shown in, for example, FIG. 13. FIG. 13 is a diagram illustrating a deviation between the instruction value and the current location of the real wave when the sine wave drive is performed. The sine wave tracking accuracy measurement process executed in the process in step S33 is more specifically performed by calculating a maximum value (deviation MAX) and a minimum value (deviation MIN) shown in the diagram in FIG. 13. The "deviation MAX" and the "deviation MIN" calculated here are outputted to the self-diagnosis judgment controller 59. Note that the accuracy measurement process is performed for the predetermined measuring time period shown by a reference numeral T2 in FIG. 12. After a lapse of the predetermined measuring time period (T2), the flow proceeds to a process in step S34.

In step S34, the image stabilization control section (50x, 50y) stops the sine wave drive.

Next, in step S35, the image stabilization control section (50x, 50y) compares the "deviation MAX" and the "deviation MIN" calculated in the aforementioned process in step S33 with a predetermined standard value R0. Here, the standard value R0 is a standard value to be diagnostic criteria indicative of whether or not the image stabilization apparatus 20 operates nor rally. The data of standard values is stored in advance in another storage medium or the like, for example, in the self-diagnosis judgment controller 59 or the image stabilization apparatus 20 and is read as appropriate when performing the process in step S35.

In the process in step S35, when the self-diagnosis judgment controller 59 confirms that "deviation MAX>standard value R0" or "deviation MIN<standard value −R0," the image stabilization control section (50x, 50y) outputs the judgment result to the control section (not shown) of the camera unit 10. Then, the flow proceeds to a process in step S46.

In step S46, the control section (not shown) of the camera unit 10 transmits the judgment result from the image stabilization apparatus 20 to the terminal apparatus (not shown). The terminal apparatus (not shown) that receives the judgment result executes a process of displaying a "first caution display" on a display screen of an image display apparatus (not shown) (similar to the process in step S25 in FIG. 9). Then, a series of processes is ended and the flow returns to the original process (return).

On the other hand, in the process in step S35, when the self-diagnosis judgment controller 59 confirms that "deviation MAX>standard value R0" or "deviation MIN<standard value −R0" is not true, the image stabilization control section (50x, 50y) proceeds to next step S36.

In step S36, the image stabilization control section (50x, 50y) compares the "deviation MAX" and the "deviation MIN" calculated in the aforementioned process in step S33 with a predetermined standard value S0 different from the standard value R0. Here, the standard value S0 is assumed to be a standard value to be diagnostic criteria when an allowable error is relaxed although the image stabilization apparatus 20 operates normally. Therefore, a value is set so as to satisfy the standard value R0>standard value S0. The data of the standard value S0 is also stored in advance in another storage medium or the like, for example, in the self-diagnosis judgment controller 59 or the image stabilization apparatus 20 and is read as appropriate when performing the process in step S14.

In the process in step S36, when the self-diagnosis judgment controller 59 confirms that "deviation MAX>standard value S0" or "deviation MIN<standard value −S0," the image stabilization control section (50x, 50y) outputs the judgment result to the control section (not shown) of the camera unit 10. Then, the flow proceeds to a process in step S47.

In step S47, the control section (not shown) of the camera unit 10 transmits the judgment result from the image stabilization apparatus 20 to the terminal apparatus (not shown). The terminal apparatus (not shown) that receives the judgment result performs a process of displaying a "second caution display" on a display screen of an image display apparatus (not shown) (similar to the process in step S26 in FIG. 9). Then, a series of processes is ended and the flow returns to the original process (return).

On the other hand, in the process in step S36, when the self-diagnosis judgment controller 59 confirms that "deviation MAX>standard value S0" or "deviation MIN<standard value −S0" is not true, the image stabilization control section (50x, 50y) proceeds to the next process in step S37.

In step S37, the image stabilization control section (50x, 50y) sets variable N indicating the specified position to N=1.

Next, in step S38, the image stabilization control section (50x, 50y) performs a process of moving the central point of the fourth lens group 14a to a specified position N (e.g., reference numeral B1 in FIG. 7). The process is substantially similar to the processes in aforementioned steps S11 and S31. Then, the flow proceeds to a process in step S39.

In step S39, the image stabilization control section (50x, 50y) starts a sine wave drive of the fourth lens group 14a and waits for the predetermined time period T1 to elapse. Then, the flow proceeds to a process in step S40. Note that the process in step S39 is similar to the process in aforementioned step S32.

In step S40, the image stabilization control section (50x, 50y) controls the deviation calculator 53 to execute the sine wave tracking accuracy measurement process for a predetermined measuring time period (see reference numeral T2 in FIG. 12). After a lapse of the predetermined measuring time period (T2), the flow proceeds to a process in step S41. Note that the process in step S40 is similar to the process in aforementioned step S33.

In step S41, the image stabilization control section (50x, 50y) stops the sine wave drive (the same as the process in aforementioned step S34).

Next, in step S42, the image stabilization control section (50x, 50y) compares the "deviation MAX" and the deviation MIN" calculated in the aforementioned process in step S40 with a predetermined standard value R1. Here, the standard value R1 is a standard value of diagnostic criteria corresponding to the specified position N when diagnosing whether or not the image stabilization apparatus 20 operates normally. The data of standard values is also stored in advance in another storage medium or the like, for example, in the self-diagnosis judgment controller 59 or the image stabilization apparatus 20 and is read as appropriate when performing the process in step S42.

In the process in step S42, when the self-diagnosis judgment controller 59 confirms that "deviation MAX>standard value R1" or "deviation MIN<standard value −R1," the image stabilization control section (50x, 50y) outputs the judgment result to the control section (not shown) of the camera unit 10. Then, the flow proceeds to a process in step S46.

In step S46, the control section (not shown) of the camera unit 10 transmits the judgment result from the image stabilization apparatus 20 to the terminal apparatus (not shown). The terminal apparatus (not shown) that receives the judgment result performs a process of displaying a "first caution display" on a display screen of an image display apparatus (not shown) (similar to the process in step S25 in FIG. 9). Then, a series of processes is ended and the flow returns to the original process (return).

On the other hand, in the process in step S42, when the self-diagnosis judgment controller 59 confirms that "deviation MAX>standard value R1" or "deviation MIN<standard value −R1" is not true, the image stabilization control section (50x, 50y) proceeds to a process in next step S43.

In step S43, the image stabilization control section (50x, 50y) compares the "deviation MAX" and the "deviation MIN" calculated in the aforementioned process in step S40 with a predetermined standard value S1 different from the standard value R1. The standard value S1 here is assumed to be a standard value to be diagnostic criteria when an allowable error is relaxed although the image stabilization apparatus 20 operates normally. Therefore, a value is set so as to satisfy standard value R1>standard value S1. The data of the standard value S1 is also stored in advance in another storage medium or the like, for example, in the self-diagnosis judgment controller 59 or the image stabilization apparatus 20 and is read as appropriate when performing the process in step S43.

In the process in step S43, when the self-diagnosis judgment controller 59 confirms that "deviation MAX>standard value S1" or "deviation MIN<standard value −S1," the image stabilization control section (50x, 50y) outputs the judgment result to the control section (not shown) of the camera unit 10. Then, the flow proceeds to a process in step S47.

In step S47, the control section (not shown) of the camera unit 10 transmits the judgment result from the image stabilization apparatus 20 to the terminal apparatus (not shown). The terminal apparatus (not shown) that receives the judgment result performs a process of displaying a "second caution display" on a display screen of an image display apparatus (not shown) (similar to the process in step S26 in FIG. 9). Then, a series of processes is ended and the flow returns to the original process (return).

On the other hand, in the process in step S43, when the self-diagnosis judgment controller 59 confirms that "deviation MAX>standard value S1" or "deviation MIN<standard value −S1" is not true, the image stabilization control section (50x, 50y) proceeds to a process in next step S44.

In step S44, the image stabilization control section (50x, 50y) sets N+1 for variable N indicating the specified position.

Next, in step S45, the image stabilization control section (50x, 50y) confirms whether or not specified position N=5. Here, N=5 is confirmed because a counter is employed to perform a sine wave accuracy measurement process at five points (four predetermined positions in addition to the reference position).

Here, when N=5 is confirmed, the diagnosis process by a series of sine wave accuracy measurements is ended and the flow returns to the original process (return).

On the other hand, when N≠5 is confirmed, the flow returns to the aforementioned process in step S38 and repeats the subsequent processes.

As described above, the first embodiment is configured to include a self-diagnosis mode in which whether or not the image stabilization apparatus 20 operates normally by performing predetermined operations on the fourth lens group holding member 14 (movable barrel) such as an operation of moving the fourth lens group holding member 14 to a predetermined target position and holding the position, moving the fourth lens group holding member 14 to a predetermined target position and causing the fourth lens group holding member 14 to perform a sine wave drive at that position, and judging whether or not the position detection result obtained by position detection of the fourth lens group holding member 14 (movable barrel) in progress falls within a pre-defined allowable range.

By executing the operation in the self-diagnosis mode periodically or at any given time, it is possible to confirm whether or not the image stabilization apparatus 20 operates normally.

Furthermore, by judging a problem, a malfunction, a deterioration situation of the apparatus or the like and notifying that a repair or replacement time is approaching, it is possible to accurately determine in advance, the possibility that problems may occur. Therefore, it is possible to contribute to improvement of reliability of an image pickup apparatus to which the image stabilization apparatus is applied and secure high reliability of a camera system including the image stabilization apparatus.

Note that the processing sequence in FIG. 9 may be configured by omitting the process in step S14, the process in step S19 and the process in step S22 respectively. Similarly, the processing sequence in FIG. 11 may be configured by omitting the process in step S36, the process in step S43 and the process in step S22 respectively.

The present embodiment has described that the stopping accuracy diagnosis process in step S1, the drive current diagnosis process in step S2 and the sine wave tracking accuracy diagnosis process in step S3 shown in FIG. 8 are sequentially executed when the image stabilization apparatus 20 operates in the self-diagnosis mode, but the present embodiment is not limited to this example. For example, when the image stabilization apparatus operates in the self-diagnosis mode, various modes may be adopted such as a mode in which only the stopping accuracy diagnosis process and the drive current diagnosis process are executed or a mode in which only the sine wave tracking accuracy diagnosis process is executed.

For example, a second embodiment of the present invention which will be described below illustrates an example of a case where a different control process is adopted when the image stabilization apparatus is operated in the self-diagnosis mode.

Figure 14:
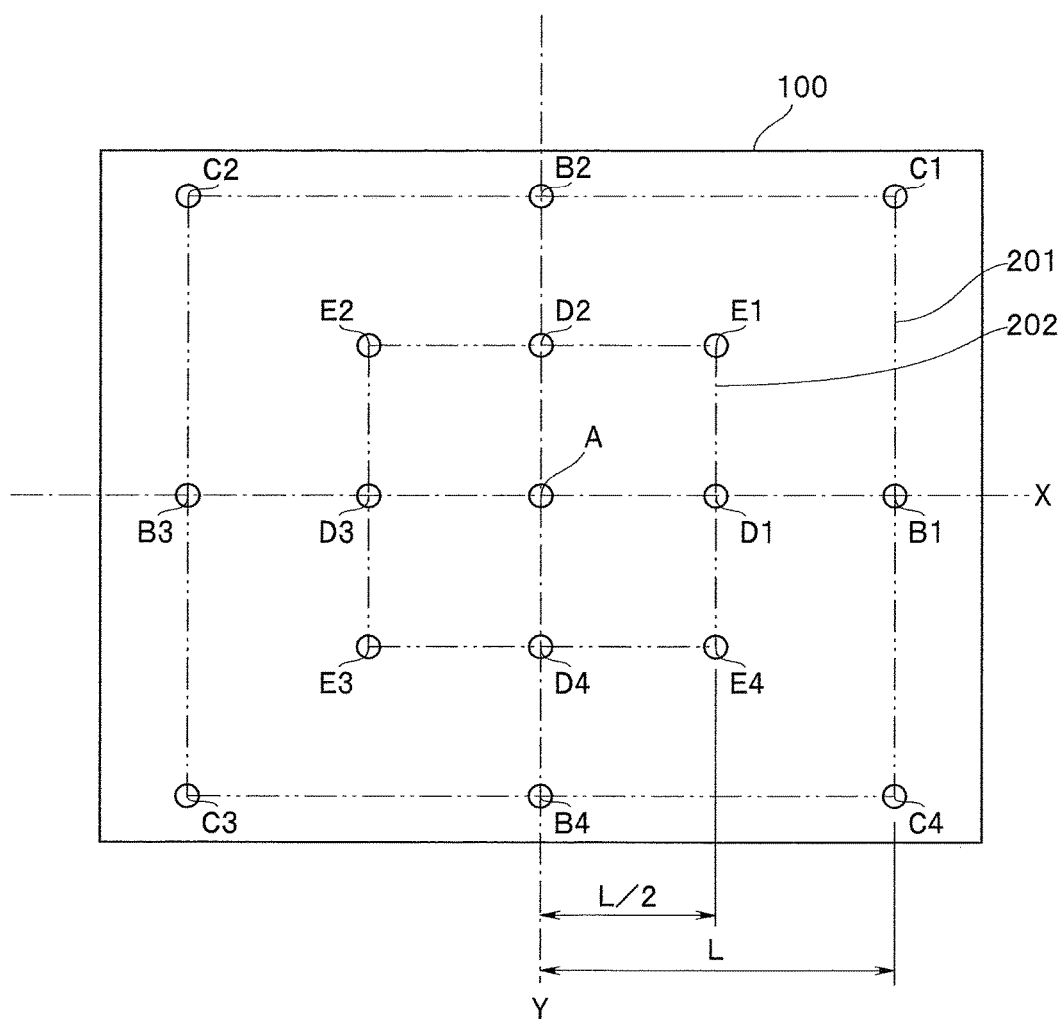
FIG. 14 is a diagram illustrating a specific example of data of self-diagnosis instruction values (moving target value) of an image stabilization apparatus according to a second embodiment of the present invention.
Figure 15:
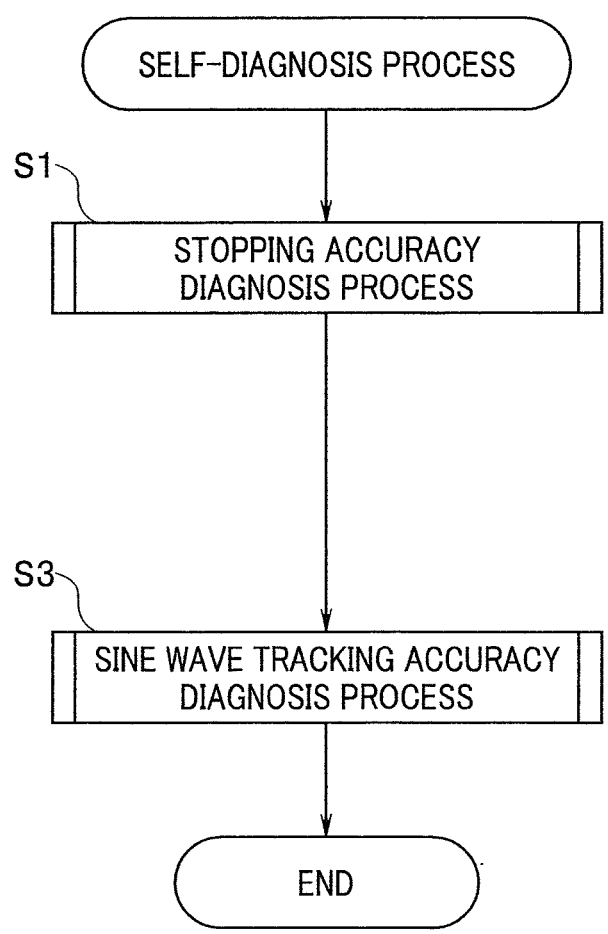
FIG. 15 is a main flowchart illustrating a processing sequence of the image stabilization apparatus of the present embodiment in a self-diagnosis mode.
Figure 16:
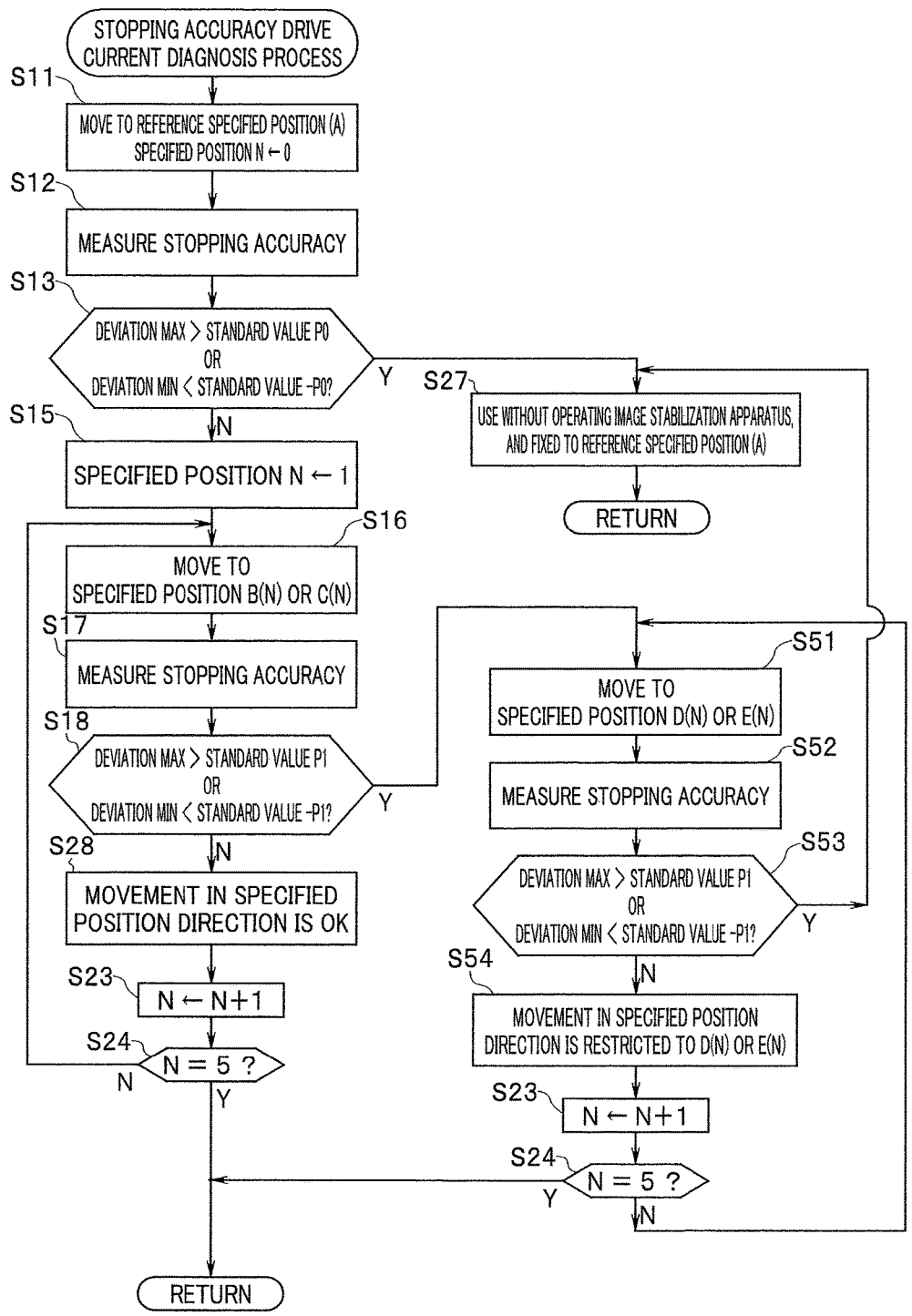
FIG. 16 is a flowchart illustrating a detailed processing sequence of the stopping accuracy diagnosis process (step S1) in FIG. 15.
Figure 17:
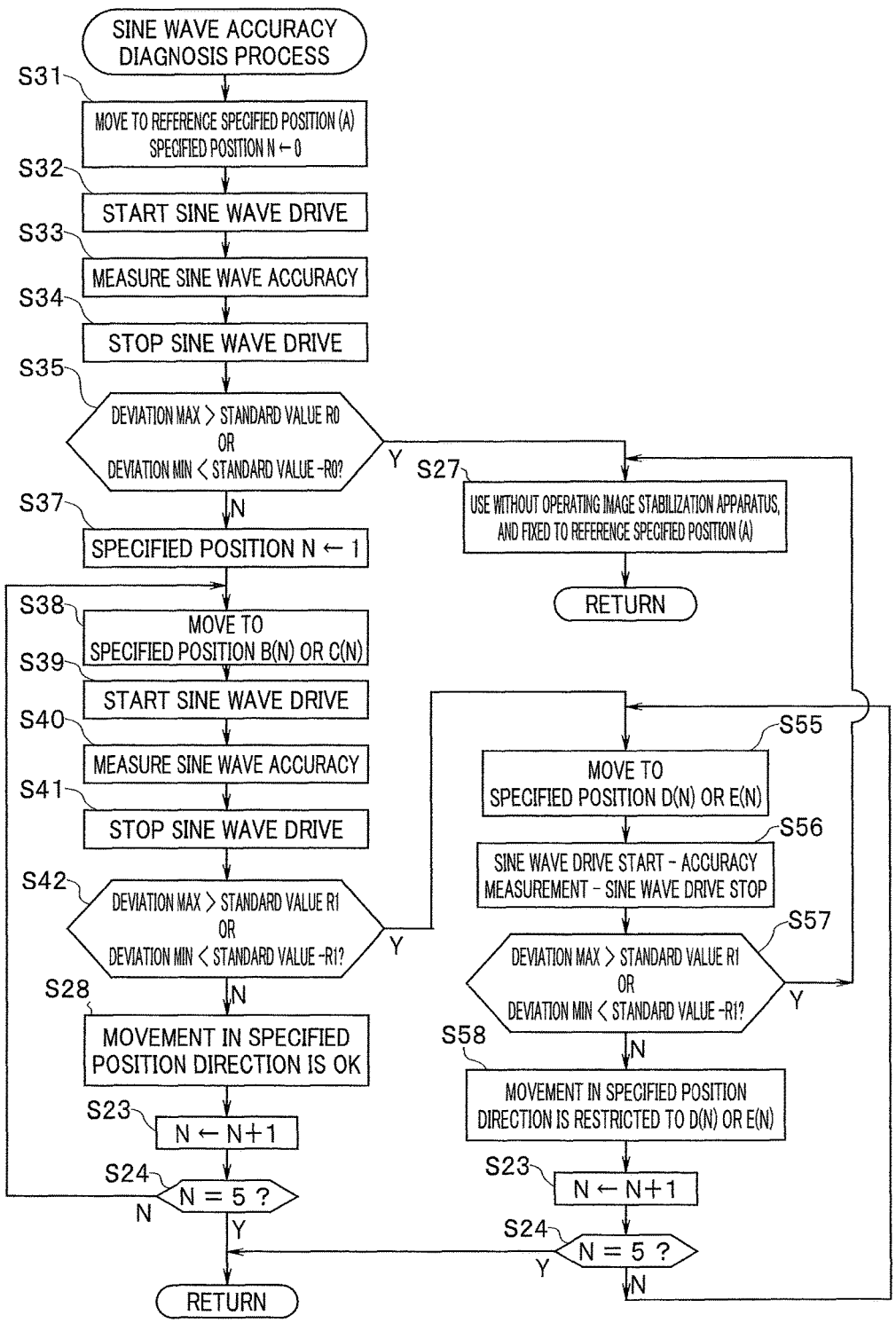
FIG. 17 is a flowchart illustrating a detailed processing sequence of the sine wave tracking accuracy diagnosis process (step S3) in FIG. 15.

FIG. 14 to FIG. 17 are diagrams illustrating a summary of the second embodiment of the present invention. Among them, FIG. 14 is a diagram illustrating data of self-diagnosis instruction values (moving target values) of an image stabilization apparatus according to the second embodiment of the present invention. FIG. 15, FIG. 16 and FIG. 17 are flowcharts illustrating processing sequences of the image stabilization apparatus of the present embodiment in the self-diagnosis mode. Among them, FIG. 15 is a main flowchart illustrating a processing sequence of the image stabilization apparatus of the present embodiment in the self-diagnosis mode. FIG. 16 is a flowchart illustrating a detailed processing sequence of the stopping accuracy diagnosis process (step S1) in FIG. 15. FIG. 17 is a flowchart illustrating a detailed processing sequence of the sine wave tracking accuracy diagnosis processing (step S3) in FIG. 15.

Basic configurations of the image stabilization apparatus of the present embodiment and the image pickup apparatus to which the image stabilization apparatus is applied are similar to the configuration in the aforementioned first embodiment. Therefore, although detailed description of the configuration is omitted, the same reference numerals will be used when the respective components are shown in the following description.

In the present embodiment, when the image stabilization apparatus is operated in the self-diagnosis mode as shown in FIG. 15, the image stabilization apparatus is controlled so as to execute a stopping accuracy diagnosis process (process in step S1 in FIG. 15) and a sine wave tracking accuracy diagnosis process (process in step S3 in FIG. 15). Furthermore, in the present embodiment, data of self-diagnosis instruction values (moving target values) which is applied to the stopping accuracy diagnosis process in the self-diagnosis mode has a mode shown in FIG. 14. Here, the processing sequence in the present embodiment is basically only different from the aforementioned embodiment in some processes, and when substantially similar processes are described, the same processing step reference numerals will be used.

That is, data of the self-diagnosis instruction values of the present embodiment are XY coordinates or the like that specify any given point on, for example, the X-Y plane as in the case of the aforementioned first embodiment (FIG. 7). The self-diagnosis instruction values of the present embodiment are more specifically data as shown in FIG. 14.

In FIG. 14, a region enclosed by a solid line denoted by reference numeral 100 shows a range in which the fourth lens group holding member 14 (fourth lens group 14a) of the image stabilization apparatus 20 can mechanically move within the XY plane orthogonal to the optical axis O (similar to FIG. 7 in the first embodiment). Regions enclosed by two-dot dashed lines denoted by reference numerals 201 and 202 respectively show correction drive ranges to be operated for image stabilization. Here, the region denoted by reference numeral 201 is assumed to be a first correction drive range. In addition, the region denoted by reference numeral 202 is assumed to be a second correction drive range. Both correction drive ranges 201 and 202 are set inside the movement drive range 100. Of the two ranges, the first correction drive range 201 is set to be an inside region immediately near the movement drive range 100 as in the case of the correction drive range 101 in the aforementioned first embodiment. The first correction drive range 201 is set so that the first correction drive range 201 can be reliably secured in consideration of mechanical variations or the like caused by machining accuracy of the movable barrel or the like in the image stabilization apparatus 20.

Furthermore, the second correction moving range 202 is set to be a range narrower than the first correction moving range 201. For example, the length of one side of the frame line shown by the second correction moving range 202 is set to be half the length of one side of the frame line of the first correction moving range 201 (details will be described later).

In FIG. 14, reference character A indicates a central point of the fourth lens group 14a, that is, a point that coincides with the optical axis O (similar to the first embodiment in FIG. 7). The image stabilization apparatus 20 is driven and controlled while the image pickup apparatus 1 (camera unit 10) to which the image stabilization apparatus 20 is applied is starting so that the central point (optical axis O) of the fourth lens group 14a substantially coincides with reference character A. Thus, a position indicated by reference character A is assumed to be a "reference specified position." The present embodiment is similar to the aforementioned first embodiment in this respect.

In FIG. 14, reference numerals B1 to B4 denote examples of target points on frame lines of the first correction moving range 201 within the movement drive range 100. That is, the target points B1 to B4 are points of intersection of the frame line indicating the first correction moving range 201 and straight lines orthogonal to the X-axis and the Y-axis respectively. In this case, the X image stabilization control section 50x is controlled to move the optical axis O from the position at reference character A to the position at reference numeral B1 or the position of reference numeral B3. Since the Y-axis does not move, the Y image stabilization control section 50y performs control to hold the position. Similarly, to move the optical axis O from the position at reference character A to the position at reference numeral B2 or the position at reference numeral B4, the Y image stabilization control section 50y is controlled and the X image stabilization control section 50x performs control to hold the position.

In FIG. 14, reference numerals C1 to C4 denote target points at substantially four corner positions on the frame line of the first correction moving range 201 within the movement drive range 100. In this case, to move the optical axis O from the position at reference character A to, for example, any one of the positions at reference numerals C1 to C4, it is necessary to control both the X image stabilization control section 50x and the Y image stabilization control section 50y.

Furthermore, in FIG. 14, reference numerals D1 to D4 denote target points on the frame line indicating the second correction moving range 202 within the movement drive range 100. That is, the target points D1 to D4 are points of intersection of the frame line of the second correction moving range 202 and straight lines orthogonal to the X-axis and the Y-axis respectively. Control in this case is substantially similar to reference numerals B1 to B4.

Note that the second correction moving range 202 is set to have a range narrower than the first correction moving range 201 as described above. More specifically, for example, when the distance between the reference specified position A and the target point B1 is assumed to be L as shown in FIG. 14, the second correction moving range 202 is set so that the distance between the reference specified position A and the target point D1 becomes L/2. The same applies to the other points.

In FIG. 14, reference numerals E1 to E4 denote target points at four corner positions in the second correction moving range 202 within the movement drive range 100 as in the case of aforementioned reference numerals C1 to C4. Control in this case is substantially similar to that denoted by reference numerals C1 to C4.

Operation becomes tougher when a position more distant from the central point is set as the moving target point in the self-diagnosis mode or when both the X-axis and the Y-axis are driven more frequently. This is because performance of the drive mechanism is generally best at the center and performance deteriorates as the distance from the center increases.

The rest of the configuration is substantially similar to that of the image stabilization apparatus of the first embodiment. Note that the configuration not mentioned above is a part not directly related to the present invention and is similar to the aforementioned first embodiment, and so illustration and detailed description of the configuration will be omitted.

Next, action of the image stabilization apparatus according to the present embodiment operated in the self-diagnosis mode will be described using FIG. 14 to FIG. 17. Note that the present embodiment will be described using FIG. 10, FIG. 12, FIG. 13 and the like among the drawings used in the aforementioned first embodiment and specific illustration will be omitted.

When the image stabilization apparatus 20 of the present embodiment operates in the self-diagnosis mode, a stopping accuracy diagnosis process in step S1 and a sine wave tracking accuracy diagnosis process in step S3 are executed sequentially as shown in FIG. 15. That is, the present embodiment is different from the aforementioned first embodiment in that the drive current diagnosis process (step S2 in FIG. 8) is omitted.

That is, details of the stopping accuracy diagnosis process in step 1 in FIG. 15 are shown in FIG. 16. As shown in FIG. 16, in step S11, the image stabilization control section (50x, 50y) performs a process of moving the central point of the fourth lens group 14a to a reference specified position (reference character A in FIG. 7) first. Here, a variable N indicating the specified position is simultaneously set to N=0. Then, the flow proceeds to a process in step S12.

That is, the image stabilization control section (50x, 50y) causes the self-diagnosis instruction value controller 58 to output an instruction value indicating a reference specified position corresponding to the variable N indicating the specified position as N=0 ((x0, y0) when shown by (x coordinate, y coordinate) and reference character A in FIG. 14). The instruction value signal is inputted to the servo controller 54 via the deviation calculator 53. The servo controller 54 receives the instruction value signal, generates a drive control signal corresponding to the inputted instruction value signal and drives and controls the image stabilization drive unit 25 of the image stabilization apparatus 20 according to the drive control signal. The flow then waits for a predetermined time period (first defined time period T1; see FIG. 10) until the fourth lens group 14a becomes stable. At this time, the position detection circuit 57 detects the position of the fourth lens group 14a based on detection signals of the magnetic sensors 28x and 28y and inputs detection position information to the deviation calculator 53. The deviation calculator 53 calculates a deviation based on the instruction value and the detection position information and outputs the calculation result to the servo controller 54. The servo controller 54 receives the calculation result, newly generates a drive control signal corresponding to the inputted instruction value signal and drives and controls the image stabilization drive unit 25 (repeated hereinafter).

The situation at this time is represented by a standby time period (first defined time period) shown by reference numeral T1 in FIG. 10. The diagram shown in FIG. 10 describes a fluctuation of the current position of the fourth lens group 14a detected by the magnetic sensors 28x and 28y and the position detection circuit 57. During an initial period of drive shown in FIG. 10, that is, during the standby time period T1, the current position of the fourth lens group 14a which is being driven fluctuates toward a target position (reference specified position A in this case), showing that the fluctuation is unstable. When the standby time period T1 elapses, the fourth lens group 14a becomes stable state. Thus, the flow proceeds to a process in next step S12 in FIG. 16.

In step S12, the image stabilization control section (50x, 50y) executes a stopping accuracy measurement process. This process is executed for a measuring time period (second defined time period) denoted by reference numeral T2 shown in FIG. 10. During the period of the measuring time period T2, the fluctuations of the target position (reference specified position A in this case) and the current position are stable as shown in FIG. 10 and both seem to coincide with each other. However, as seen in an enlarged view denoted by reference numeral S in FIG. 10, a minute fluctuation is actually observed. Thus, the stopping accuracy measurement process executed in step S12 is a process of measuring a maximum value (deviation MAX) and a minimum value (deviation MIN) among minute fluctuations. This process is obtained by the deviation calculator 53 calculating a deviation based on the detection position information signal (current position information) and the instruction value signal from the position detection circuit 57. The "deviation MAX" and the "deviation MIN" obtained here are outputted to the self-diagnosis judgment controller 59.

Next, in step S13 in FIG. 15, the image stabilization control section (50x, 50y) compares the "deviation MAX" and the "deviation MIN" calculated in the aforementioned process in step S12 with a predetermined standard value ±P0. Here, the standard value ±P0 is a standard value to be diagnostic criteria indicative of whether or not the image stabilization apparatus 20 operates normally. The data of standard values is assumed to be stored in advance, for example, in the self-diagnosis judgment controller 59. In addition, the data of standard values may be stored in advance in a storage medium provided in another region, for example, inside the image stabilization apparatus 20 and may be read as appropriate when performing the process in step S13. In the present embodiment, more specifically, the standard value ±P0=±8 mm, for example.

In the process in step S13, when the self-diagnosis judgment controller 59 confirms that the "deviation MAX>standard value P0" or "deviation MIN<standard value −P0," the image stabilization control section (50x, 50y) outputs the judgment result to the control section (not shown) of the camera unit 10. In response to this, the control section (not shown) of the camera unit 10 judges that a malfunction, an abnormality or a corresponding symptom has occurred in the image stabilization apparatus 20. Then, the flow proceeds to a process in step S27. Note that (deviation MAX) (deviation MIN) may be calculated using the deviation MAX and the deviation MIN to be then compared with a corresponding standard P0'.

In step S27, the control section (not shown) of the camera unit 10 controls the image stabilization apparatus 20 to stop the operation of the image stabilization apparatus 20 and performs control so that the reference specified position A is maintained. That is, the control section causes the image stabilization apparatus 20 to stand still so that the optical axis of the fourth lens group 14a is kept coinciding with the reference specified position A. At the same time, the control section (not shown) of the camera unit 10 transmits the judgment result from the image stabilization apparatus 20 to the terminal apparatus (not shown) connected via communication means (not shown) such as of the wired cable or wireless or via a network (not shown). The terminal apparatus (not shown) that receives the judgment result performs a process of displaying "image stabilization apparatus malfunction display" on a display screen of an image display apparatus (not shown) (not shown in the flowchart) or the like. Then, a series of processes is ended and the flow returns to the original process (return).

As described above, in the process in step S13, when at least one of the current "deviation MAX" and "deviation MIN" exceeds the predetermined standard value ±P0, it is judged that a malfunction, an abnormality or a corresponding symptom has occurred in the image stabilization apparatus 20 and operation of the image stabilization apparatus 20 thereafter is stopped. Therefore, the image stabilization operation is no longer executed in this case, but on the other hand, the image stabilization drive unit 25 performs operation control so as to cause the fourth lens group holding member 14 to stand still at the reference specified position A which is the center of the optical axis. Therefore, the camera unit 10 can continue the operation of acquiring image data. That is, a minimum necessary operation as the camera unit 10 is secured. Moreover, the image data obtained in that case can be kept as data of high quality with less deterioration. Note that when the deviation is significantly bad compared to the standard value ±P0, it is preferable to issue an error display and perform control to even stop the operation of the image stabilization drive unit 25.

On the other hand, in the process in step S13, when the self-diagnosis judgment controller 59 confirms that "deviation MAX>standard value P0" or "deviation MIN<standard value −P0" is not true, the image stabilization control section (50x, 50y) proceeds to a process in next step S15.

In step S15, the image stabilization control section (50x, 50y) sets the variable N indicating the specified position to N=1. In this case, if the central point of the fourth lens group 14a is assumed to be moved from the reference specified position A to reference numeral B(N), the target position B(N) becomes B(N)=B1. Similarly, if the central point of the fourth lens group 14a is assumed to be moved from the reference specified position A to reference numeral C(N), the target position C(N) becomes C(N)=C1.

Next, in step S16, the image stabilization control section (50x, 50y) performs a process to move the central point of the fourth lens group 14a to a specified position corresponding to the variable N=1 indicating the specified position (e.g., coordinates (x1, y0) when the target position is assumed to be reference numeral B1 in FIG. 14 or coordinates (x1, y1) when the target position is assumed to be reference numeral C1 in FIG. 14). The process is substantially similar to the aforementioned process in step S11. Then, the flow proceeds to a process in step S17.

Next, in step S17, the image stabilization control section (50x, 50y) executes a stopping accuracy measurement process. The process is substantially similar to the aforementioned process in step S12. Then, the flow proceeds to a process in step S18.

In step S18, the image stabilization control section (50x, 50y) compares the "deviation MAX" and the "deviation MIN" calculated in the aforementioned process in step S17 with the predetermined standard value ±P1. Here, the standard value ±P1 is a standard value to be diagnostic criteria indicative of whether or not the image stabilization apparatus 20 operates normally as in the case of the standard value ±P0. The data of standard value ±P1 is also stored in advance in another storage medium or the like, for example, in the self-diagnosis judgment controller 59 or the image stabilization apparatus 20 and is read as appropriate when performing the process in step S18.

The drive accuracy generally tends to decrease as the amount of movement increases, that is, in the case of movement to a peripheral region away from the central region. Therefore, regarding a reference value of stopping accuracy, the drive accuracy in the movement to the peripheral region may be set to be slightly lower than the drive accuracy in the central region, that is, so as to satisfy the standard value P1>standard value P0 or the like. In the present embodiment, when, for example, the stopping accuracy standard value ±P0 at the reference specified position A is assumed to be ±P0=±8 μm, the standard value ±P1 of stopping accuracy in the case of movement from the reference specified position A to the peripheral region (target values B1, C1 or the like) is set to ±P1=±10 μm or the like. The process in step S18 is substantially similar to the aforementioned process in step S13.

That is, in the process in step S18, when the self-diagnosis judgment controller 59 confirms that the "deviation MAX>standard value P1" or "deviation MIN<standard value −P1," the image stabilization control section (50x, 50y) proceeds to a process in step S51.

That is, in the process in step S18, when at least one of the "deviation MAX" and the "deviation MIN" exceeds the predetermined standard value ±P1 in the movement to the target point B1 or C1, it is judged that a malfunction, an abnormality or a corresponding symptom has occurred in the image stabilization apparatus 20 and the flow proceeds to a process in step S51.

In step S51, the image stabilization control section (50x, 50y) tries to move the central point to another target point such as a target point D(N) or E(N) as the specified position on a side close to the central region. That is, in above step S51, the image stabilization control section (50x, 50y) performs a process of moving the central point of the fourth lens group 14a to a specified position corresponding to the specified position variable N=1 (e.g., coordinates (x1/2, y0) when the target position is assumed to be reference numeral D1 in FIG. 14 or coordinates (x1/2, y1/2) when the target position is assumed to be reference numeral E1 in FIG. 14). The process is substantially similar to the process in aforementioned step S16. Then, the flow proceeds to a process in step S52.

Next, in step S52, the image stabilization control section (50x, 50y) performs a stopping accuracy measurement process. The process is substantially similar to the aforementioned processes in steps S12 and S17. Then, the flow proceeds to a process in step S53.

In step S53, the image stabilization control section (50x, 50y) compares the "deviation MAX" and the "deviation MIN" calculated in the aforementioned process in step S52 with the predetermined standard value ±P1. The process is substantially similar to the aforementioned processes in steps S13 and S18. In the case of movement to the target point D(N) or E(N), when at least one of the "deviation MAX" and the "deviation MIN" exceeds the predetermined standard value ±P1, it is judged that a malfunction, an abnormality or a corresponding symptom has occurred in the image stabilization apparatus 20 and the flow proceeds to a process in step S27.

In step S27, the control section (not shown) of the camera unit 10 controls the image stabilization apparatus 20 to stop the operation of the image stabilization apparatus 20 and performs control so as to maintain the reference specified position A. That is, the image stabilization apparatus 20 is caused to stand still so that the optical axis of the fourth lens group 14a is kept coinciding with the reference specified position A. At the same time, the control section (not shown) of the camera unit 10 transmits the judgment result from the image stabilization apparatus 20 to the terminal apparatus (not shown) connected via communication means (not shown) such as of the wired cable or wireless or via a network (not shown). The terminal apparatus (not shown) that receives the judgment result performs a process of displaying an "image stabilization apparatus malfunction display" on a display screen of an image display apparatus (not shown) (not shown on the flowchart) or the like. Then, a series of processes is ended and the flow returns to the original process (return).

On the other hand, in the process in step S53, when the self-diagnosis judgment controller 59 confirms that the "deviation MAX>standard value P1" or "deviation MIN<standard value −P1" is not true, the image stabilization control section (50x, 50y) proceeds to a process in next step S54.

In step S54, the control section (not shown) of the camera unit 10 restricts the amount of image stabilization movement in the specified direction carried out in the image stabilization operation by the image stabilization apparatus 20 so that such a movement is performed in a region where the amount of movement is small, that is, in the second correction moving range 202. Then, the flow proceeds to a process in step S23.

In step S23, the image stabilization control section (50x, 50y) increments the variable N of the specified position to (N+1) and proceeds to next step S24.

In step S24, the image stabilization control section (50x, 50y) confirms whether or not the variable N of the specified position is N=5. N=5 is confirmed here to measure accuracy in the self-diagnosis mode at the reference specified position (reference character A in FIG. 14) and four specified positions (reference numerals B1 to B4, reference numeral C1 to C4, reference numeral D1 to D4 or reference numerals E1 to E4 in FIG. 14) (that is, to repeat processes four times). Therefore, the number of measurement specified positions is not limited to this. To increment or decrement the number of specified positions, the numerical value to be substituted into the variable N in the process in step S24 may be incremented or decremented.

When N=5 in the process in step S24, a series of processes is ended and the flow returns to the original process (return). On the other hand, when N=5 is not confirmed, the flow returns to the process in step S51 and repeats the subsequent processes.

On the other hand, in the process in step S18, when the self-diagnosis judgment controller 59 confirms that the "deviation MAX>standard value P1" or "deviation MIN<standard value −P1" is not true, the image stabilization control section (50x, 50y) proceeds to a process in next step S28.

In step S28, the image stabilization control section (50x, 50y) judges, based on the judgment result in the aforementioned process in step S18, that no problem in the movement of the image stabilization apparatus 20 exists in the specified position direction, that is, the movement from the reference specified position A to the target point B1 or C1. Then, the flow proceeds to a process in next step S23.

In step S23, the image stabilization control section (50x, 50y) increments the variable N of the specified position to (N±1) and proceeds to next step S24.

In step S24, the image stabilization control section (50x, 50y) confirms whether or not the variable N of the specified position is N=5. N=5 is confirmed here to measure accuracy in the self-diagnosis mode at the reference specified position (reference character A in FIG. 7) and four specified positions (reference numerals B1 to B4 or reference numeral C1 to C4 in FIG. 7). Therefore, the number of measurement specified positions is not limited to this. To increment or decrement the number of specified positions, the numerical value to be substituted into the variable N in the process in step S24 may be operated.

When N=5 in the process in above step S24, a series of processes is ended and the flow returns to the original process (return). On the other hand, when N=5 is not confirmed, the flow returns to the process in step S16 and repeats the subsequent processes.

Thus, when the flow returns to FIG. 15 after ending the processing sequence in FIG. 16, a sine wave tracking accuracy diagnosis process in next step S3 in FIG. 15 is executed. Details of the sine wave tracking accuracy diagnosis process are as shown in FIG. 17. Note that the flowchart in FIG. 17 includes processing steps similar to the steps in FIG. 11 in the aforementioned first embodiment. Therefore, in FIG. 17, processing steps similar to the processing steps in FIG. 11 will be described assigned the same reference numerals.

First, in step S31 in FIG. 11, the image stabilization control section (50x, 50y) performs a process of moving the central point of the fourth lens group 14a to a reference specified position (reference character A in FIG. 7). At the same time, a variable N indicating a specified position is set to N=0. The process in step S31 is similar to the process in step S11 in FIG. 9, FIG. 11 and FIG. 16. Then, the flow proceeds to a process in step S32.

In step S32, the image stabilization control section (50x, 50y) controls the self-diagnosis instruction value controller 58 to generate a sine wave and thereby starts a sine wave drive to drive the fourth lens group 14a. At this time, the fourth lens group 14a is located at the specified position (reference specified position A at the current point in time) through the aforementioned process in step S31. Therefore, when the sine wave drive is started in step S32, the fourth lens group 14a vibrates centered on the specified position (reference specified position A at the current point in time). After the sine wave drive is started, the flow waits for a predetermined time period T1 (see FIG. 12) to elapse. Then, the flow proceeds to a process in step S33.

Note that in the process in step S32, in order for the self-diagnosis instruction value controller 58 to generate a drive sine wave, the self-diagnosis instruction value controller 58 references table data stored in advance in another storage medium or the like in itself (self-diagnosis instruction value controller 58) or in the image stabilization apparatus 20 or the self-diagnosis instruction value controller 58 itself performs trigonometric function calculation through an inner calculation circuit.

Here, fluctuations in the current position of the fourth lens group 14a detected by the magnetic sensors 28x and 28y and the position detection circuit 57 are similar to the fluctuations described above in FIG. 12. The reference numeral T1 shown in FIG. 12 is the above-described predetermined time period T1 and is the standby time period T1 after a drive start and before a measurement start. In the present processing sequence, during the initial period of the drive shown in FIG. 12, that is, during the standby time period T1, the flow waits for accuracy measurement and starts a sine wave tracking accuracy measurement process (process in step S33 in FIG. 11) after a lapse of the standby time period T1. As shown in FIG. 12, the real vibration (displacement of the current position) by the sine wave drive occurs slightly later than the supplied sine wave (drive wave).

In step S33, the image stabilization control section (50x, 50y) controls the deviation calculator 53 and executes a sine wave tracking accuracy measurement process. The measurement process is obtained by calculating a deviation based on the detection position information signal (current position information of the fourth lens group 14a which is an entity) from the position detection circuit 57 and a drive sine wave (instruction value) outputted from the self-diagnosis instruction value controller 58. The result is as shown in, for example, FIG. 13. FIG. 13 is a diagram illustrating a deviation between the instruction value and the current location of the entity when the sine wave drive is performed. The sine wave tracking accuracy measurement process executed in the process in step S33 is more specifically performed by calculating a maximum value (deviation MAX) and a minimum value (deviation MIN) shown in the diagram in FIG. 13. The "deviation MAX" and the "deviation MIN" calculated here are outputted to the self-diagnosis judgment controller 59. Note that the accuracy measurement process is performed in the predetermined measuring time period shown by reference numeral T2 in FIG. 12. After a lapse of the predetermined measuring time period (T2), the flow proceeds to a process in step S34.

In step S34, the image stabilization control section (50x, 50y) stops the sine wave drive.

Next, in step S35, the image stabilization control section (50x, 50y) compares the "deviation MAX" and the "deviation MIN" calculated in the aforementioned process in step S33 with a predetermined standard value ±R0. Here, the standard value ±R0 is a standard value to be diagnostic criteria indicative of whether or not the image stabilization apparatus 20 operates normally. The data of standard values is stored in advance in another storage medium or the like, for example, in the self-diagnosis judgment controller 59 or the image stabilization apparatus 20 and is read as appropriate when performing the process in step S35.

In the process in step S35, when the self-diagnosis judgment controller 59 confirms that "deviation MAX>standard value R0" or "deviation MIN<standard value −R0," the image stabilization control section (50x, 50y) outputs the judgment result to the control section (not shown) of the camera unit 10. The terminal apparatus (not shown) of the camera unit 10 that receives the judgment result judges that a malfunction, an abnormality or a corresponding symptom has occurred in the image stabilization apparatus 20. Then, the flow proceeds to a process in step S27.

In step S27, the control section (not shown) of the camera unit 10 controls the image stabilization apparatus 20 to stop the operation of the image stabilization apparatus 20 and performs control so that the reference specified position A is maintained. That is, the control section causes the image stabilization apparatus 20 to stand still so that the optical axis of the fourth lens group 14a is kept coinciding with the reference specified position A. At the same time, the control section (not shown) of the camera unit 10 transmits the judgment result from the image stabilization apparatus 20 to the terminal apparatus (not shown) connected via communication means (not shown) such as of the wired cable or wireless or via a network (not shown). The terminal apparatus (not shown) that receives the judgment result performs a process of displaying an "image stabilization apparatus malfunction display" on a display screen of an image display apparatus (not shown) (not shown in the flowchart) or the like. Then, a series of processes is ended and the flow returns to the original process (return).

On the other hand, in the process in step S35, when the self-diagnosis judgment controller 59 confirms that "deviation MAX>standard value R0" or "deviation MIN<standard value −R0" is not true, the image stabilization control section (50x, 50y) proceeds to a process in next step S37.

In step S37, the image stabilization control section (50x, 50y) sets the variable N indicating the specified position to N=1. In this case, if a movement is assumed to take place from the reference specified position A to reference numeral B(N), the target position B(N) becomes B(N)=B1. Similarly, if a movement is assumed to take place from the reference specified position A to reference numeral C(N), the target position C(N) becomes C(N)=C1.

Next, in step S38, the image stabilization control section (50x, 50y) performs a process of moving the central point of the fourth lens group 14a to a specified position N (e.g., reference numeral B1 or C1 in FIG. 14).

In step S39, the image stabilization control section (50x, 50y) starts a sine wave drive of the fourth lens group 14a and waits for the predetermined time period T1 to elapse. Then, the flow proceeds to a process in step S40. Note that the process in step S39 is similar to the aforementioned process in step S32.

In step S40, the image stabilization control section (50*x*, 50*y*) controls the deviation calculator 53 to execute a sine wave tracking accuracy measurement process for a predetermined measuring time period (see reference numeral T2 in FIG. 12). After a lapse of the predetermined measuring time period (T2), the flow proceeds to a process in step S41. Note that the process in step S40 is similar to the aforementioned process in step S33.

In step S41, the image stabilization control section (50*x*, 50*y*) stops the sine wave drive (the same as the aforementioned process in step S34).

Next, in step S42, the image stabilization control section (50*x*, 50*y*) compares the "deviation MAX" and the "deviation MIN" calculated in the aforementioned process in step S40 with the predetermined standard value ±R1. Here, the standard value ±R1 is a standard value to be diagnostic criteria corresponding to the specified position N when diagnosing whether or not the image stabilization apparatus 20 operates normally. The data of standard value is also stored in advance in another storage medium or the like, for example, in the self-diagnosis judgment controller 59 or the image stabilization apparatus 20 and is read as appropriate when performing the process in step S42.

In the process in step S42, when the self-diagnosis judgment controller 59 confirms that the "deviation MAX>standard value R1" or "deviation MIN<standard value −R1," the image stabilization control section (50*x*, 50*y*) proceeds to a process in step S55. That is, in the process in step S42, when at least one of the "deviation MAX" and the "deviation MIN" exceeds a predetermined standard value ±R1 during the movement to the target point B1 or C1, it is judged that a malfunction, an abnormality or a corresponding symptom has occurred in the image stabilization apparatus 20 and the flow proceeds to a process in step S55.

In step S55, the image stabilization control section (50*x*, 50*y*) tries to move the central point to another target point such as a target point D(N) or E(N) as the specified position on a side close to the central region. That is, in above step S55, the image stabilization control section (50*x*, 50*y*) performs a process of moving the central point of the fourth lens group 14*a* to a specified position corresponding to the specified position variable N=1 (e.g., coordinates (x1/2, y0) when the target position is assumed to be reference numeral D1 in FIG. 14 or coordinates (x1/2, y1/2) when the target position is assumed to be reference numeral E1 in FIG. 14). The process is substantially similar to the process in aforementioned step S38. Then, the flow proceeds to a process in step S56.

Next, in step S56, the image stabilization control section (50*x*, 50*y*) executes a series of operation processes such as starting a sine wave drive, performing sine wave accuracy measurement and stopping the sine wave drive (processes similar to the processes in steps S32 to S34, step S39 to S41). Then, the flow proceeds to a process in step S57.

In step S57, the image stabilization control section (50*x*, 50*y*) compares the "deviation MAX" and the "deviation MIN" calculated in the aforementioned process in step S56 with the predetermined standard value ±R1. The process is substantially similar to the aforementioned process in step S42.

Here, when at least one of the "deviation MAX" and the "deviation MIN" during the movement to the target point D(N) or E(N) exceeds the predetermined standard value ±R1, it is judged that a malfunction, an abnormality or a corresponding symptom has occurred in the image stabilization apparatus 20 and the flow proceeds to a process in step S27.

In step S27, the control section (not shown) of the camera unit 10 controls the image stabilization apparatus 20 to stop the operation of the image stabilization apparatus 20 and performs control so that the reference specified position A is maintained. That is, the image stabilization apparatus 20 is caused to stand still so that the optical axis of the fourth lens group 14*a* is kept coinciding with the reference specified position A. At the same time, the control section (not shown) of the camera unit 10 transmits the judgment result from the image stabilization apparatus 20 to the terminal apparatus (not shown) connected via communication means (not shown) such as of the wired cable or wireless or via a network (not shown). The terminal apparatus (not shown) that receives the judgment result performs a process of displaying an "image stabilization apparatus malfunction display" on a display screen of an image display apparatus (not shown) (not shown on the flowchart) or the like. Then, a series of processes is ended and the flow returns to the original process (return).

On the other hand, in the process in step S57, when the self-diagnosis judgment controller 59 confirms that the "deviation MAX>standard value R1" or "deviation MIN<standard value −R1" is not true, the image stabilization control section (50*x*, 50*y*) proceeds to a process in next step S58.

In step S58, the control section (not shown) of the camera unit 10 restricts the amount of image stabilization movement in the specified direction carried out in the image stabilization operation by the image stabilization apparatus 20 so that such a movement is performed in a region where the amount of movement is small, that is, in the second correction moving range 202. Then, the flow proceeds to a process in step S23.

In step S23, the image stabilization control section (50*x*, 50*y*) increments the variable N of the specified position to (N±1) and proceeds to next step S24.

In step S24, the image stabilization control section (50*x*, 50*y*) confirms whether or not the variable N of the specified position is N=5.

When N=5 in the process in step S24, a series of processes is ended and the flow returns to the original process (return). On the other hand, when N=5 is not confirmed, the flow returns to the process in step S55 and repeats the subsequent processes.

On the other hand, in the process in step S42, when the self-diagnosis judgment controller 59 confirms that the "deviation MAX>standard value R1" or "deviation MIN<standard value −R1" is not true, the image stabilization control section (50*x*, 50*y*) proceeds to a process in next step S28.

In step S28, the image stabilization control section (50*x*, 50*y*) judges, based on the judgment result in the aforementioned process in step S42, that no problem exists in the movement of the image stabilization apparatus 20 in the specified position direction, that is, the movement from the reference specified position A to the target point B1 or C1. Then, the flow proceeds to a process in next step S23.

In step S23, the image stabilization control section (50*x*, 50*y*) increments the variable N of the specified position to (N+1) and proceeds to next step S24.

In step S24, the image stabilization control section (50*x*, 50*y*) confirms whether or not the variable N of the specified position is N=5. When N=5, a series of processes is ended and the flow returns to the original process (return). When N=5 is not confirmed, the flow returns to the process in step S38 and repeats the subsequent processes.

As described above, the second embodiment can obtain effects similar to the effects in the aforementioned first embodiment. Furthermore, the second embodiment periodically operates in the self-diagnosis mode, thereby judges a problem or a malfunction of the apparatus, a deterioration situation of the apparatus or the like and notifies that the repair or replacement time is approaching, and can thereby accurately determine in advance, the possibility that problems may occur. At the same time, it is possible to stop the image stabilization operation based on the judgment result about a problem or a malfunction of the apparatus, a deterioration situation of the apparatus or the like in accordance with the degree of deterioration or the like or perform control such as restricting the amount of image stabilization movement in the image stabilization operation, that is, securing a minimum necessary operation as the image pickup apparatus (camera unit 10), and continuously performing operation of acquiring image data with high quality with less deterioration. Therefore, it is possible to implement the image stabilization apparatus 20 with high reliability and also contribute to improvement of reliability of an image pickup apparatus and a camera system using the image stabilization apparatus 20.

Note that the above-described embodiments have described, as an example, the image stabilization apparatus 20 provided with a so-called lens shift type optical image stabilization mechanism configured to use the fourth lens group holding member 14 that holds the fourth lens group 14a which are some optical lenses making up an image pickup optical system as a movable barrel, and move the fourth lens group holding member 14 within the XY plane orthogonal to the optical axis O of the image pickup optical system to thereby perform image stabilization. The present invention is not limited to the image stabilization apparatus in such a mode. The present invention is likewise applicable to an image stabilization apparatus provided with a so-called sensor shift type optical image stabilization mechanism configured to use, for example, a holding member that holds an image pickup device as a movable barrel, and move the holding member (movable barrel) within a plane along the light receiving surface of the image pickup device (within the plane orthogonal to the optical axis O of the image pickup optical system) to thereby perform image stabilization.

Although a case has been described in the foregoing embodiments of the present invention where the present invention is applied to a stationary camera (monitoring or crime prevention camera or vehicle-mounted camera or the like) as the image pickup apparatus having an image pickup function, in addition to such an example, the present invention is also applicable to a normal general type image pickup apparatus, that is, a general camera carried held in hand by a user (e.g., digital single-lens reflex camera), a small device such as portable type communication terminal apparatus, a type of camera incorporated in a stationary device (e.g., television receiver). The present invention is also applicable to an industrial or medical optical device having an image pickup function such as an endoscope or microscope.

The present invention is not limited to the aforementioned embodiments as they are but can be implemented by modifying the components without departing from the spirit and scope of the present invention in the implementation stage. Various inventions can be formed by appropriately combining a plurality of components disclosed in the above-described embodiments. For example, some components may be deleted from all the components disclosed in the embodiments. Furthermore, components across different embodiments may be combined as appropriate.

Note that although the scope of claims, specification and operation flows in the drawings are described using terms like "first" and "next" for convenience, these terms do not mean that the invention should necessarily be implemented in the specified order. Moreover, it goes without saying that parts of respective steps making up these operation flows that do not affect the essence of the present invention can be omitted as appropriate.

Of the techniques described here, many of controls and functions described using mainly flowcharts can be set using a program and the aforementioned controls and functions can be implemented by a computer reading and executing the program. A whole or part of the program can be recorded or stored as a computer program product in a portable medium such as a flexible disk, a CD-ROM, a non-volatile memory or a storage medium such as a hard disk, a volatile memory, and can be circulated or provided at product shipment or via a portable medium or a communication channel. A user can easily implement the image pickup device according to the present embodiment by downloading the program to a computer via a communication network and install the program in the computer or install the program in the computer from the recording medium.

The procedures of the respective processing sequences described in the aforementioned respective embodiments can be changed unless contrary to the nature of the processing sequences. Therefore, for the aforementioned processing sequences, for example, it may be possible to change the order of executing each processing step, simultaneously execute a plurality of processing steps or change the order of the respective processing steps every time a series of processing sequences is executed. That is, although the scope of claims, the specification and the operation flows in the drawings are described using terms like "first" and "next" for convenience, these terms do not mean that the invention should necessarily be implemented in the specified order. Moreover, it goes without saying that parts of respective steps making up these operation flows that do not affect the essence of the present invention can be omitted as appropriate.

Of the techniques described here, many of controls and functions described using mainly flowcharts can be set using a software program and the aforementioned controls and functions can be implemented by a computer reading and executing the software program. The software program is electronic data, a whole or part of which can be recorded or stored as a computer program product in a product manufacturing step in advance, in the above storage medium, storage section or the like, or more specifically in a portable medium such as a flexible disk, a CD-ROM, a non-volatile memory or a storage medium such as a hard disk, a volatile memory. Aside from this, the software program can be circulated or supplied at the time of shipment of the product or via a portable medium or communication channel. Even after shipment of the product, a user may download the software program to a computer via a communication network or the Internet and install the software program in the computer or install the software program in the computer from the recording medium, enable the software program to operate, and can thereby easily implement the image pickup device according to the present embodiment.

Note that the present invention is not limited to the aforementioned embodiments and it goes without saying that various modifications and applications can be made without departing from the spirit and scope of the present invention. Furthermore, the above embodiments include inventions in various stages and various kinds of invention can be extracted with an appropriate combination of a plurality of disclosed configuration requirements. For example, when several configuration requirements are deleted from all configuration requirements disclosed in the above embodiments, if the problems to be solved by the invention can be solved and advantageous effect of the invention can be achieved, the configuration from which the configuration requirements are deleted can be extracted as an invention. Moreover, components among different embodiments may be combined as appropriate. The invention is not restricted by any specific aspects except being limited by the appended claims.

In addition to an image pickup apparatus having an image pickup function and provided with an image stabilization mechanism, for example, a fixed installation type camera (monitoring or crime prevention camera or vehicle-mounted camera), the present invention is likewise applicable to a common image pickup apparatus, such as a common camera held in hand by a user, for example, a digital single-lens reflex camera, a compact digital camera or a lens type camera, and a moving image camera such as a video camera or a movie camera. Furthermore, the present invention is also applicable to small devices, for example, a portable type communication terminal apparatus such as a mobile phone or a smartphone, a portable type information terminal (PDA: personal digital assist) such as an electronic notebook or a camera incorporated in a stationary device such as a television receiver or a personal computer. The present invention is also likewise applicable to an industrial or medical optical device having an image pickup function such as an endoscope or microscope.

What is claimed is:

1. An image stabilization apparatus comprising:
   a fixed barrel;
   a movable barrel which holds an optical lens or an image pickup device;
   a support member which movably supports the movable barrel with respect to the fixed barrel within a plane orthogonal to an optical axis of the optical lens or within a plane along a light receiving surface of the image pickup device;
   a drive unit comprising a magnet and a coil, the drive unit driving the movable barrel with respect to the fixed barrel;
   a drive circuit which drives and controls the drive unit;
   a position detection circuit which detects a position of the movable barrel within the plane; and
   a judgment circuit which (i) detects, when the drive circuit drives and controls, via the drive unit, the movable barrel so as to move to a predetermined target position, a deviation between the position of the movable barrel detected by the position detection circuit and the predetermined target position, and (ii) judges a possibility that a malfunction has occurred in the image stabilization apparatus, based on whether or not the deviation falls within a first allowable range,
   wherein, when the judgment circuit judges that there is a possibility that a malfunction has occurred in the image stabilization apparatus, the drive circuit restricts a moving range of the movable barrel to a range which is narrower than a normal range and in which image stabilization is capable of being performed by moving the movable barrel.

2. The image stabilization apparatus according to claim 1, wherein the judgment circuit evaluates a deterioration state of the image stabilization apparatus based on whether or not the deviation detected by the position detection circuit falls within a second allowable range which is narrower than the first allowable range, and notifies that a repair or replacement time approaches.

3. The image stabilization apparatus according to claim 1, wherein the judgment circuit detects a deviation between the position of the movable barrel detected by the position detection circuit and the predetermined target position within a second defined time period after a lapse of a first defined time period after the drive circuit starts to drive and control the movable barrel to move to the predetermined target position via the drive unit, compares a maximum value and a minimum value of the deviation with respective predefined reference allowable values, and judges the operation possibility that a malfunction has occurred in the image stabilization apparatus.

4. The image stabilization apparatus according to claim 1, wherein the predetermined target position is a central position and a position in a vicinity of a peripheral edge in a range within the plane in which the movable barrel can move is movable.

5. The image stabilization apparatus according to claim 1, wherein when the drive circuit causes the movable barrel to move to the predetermined target position via the drive unit, and drives and controls the movable barrel to perform a sine wave drive centered on the predetermined target position, the judgment circuit detects a deviation between a real position of the movable barrel detected by the position detection circuit and a defined position centered on the predetermined target position at which the movable barrel has to be located during the sine wave drive, and judges the possibility that a malfunction has occurred in the image stabilization apparatus based on whether or not the deviation falls within the first allowable range.

6. The image stabilization apparatus according to claim 1, further comprising an image stabilization controller which detects, when the drive circuit causes the movable barrel to move to the predetermined target position via the drive unit, a drive current value supplied to the drive unit to maintain the predetermined target position,
   wherein the judgment circuit compares the detected current value detected by the image stabilization controller with a predefined reference current value, and judges the possibility that a malfunction has occurred in the image stabilization apparatus based on whether or not the detected current value falls within the first allowable range.

7. The image stabilization apparatus according to claim 6, wherein the judgment circuit evaluates a deterioration state of the image stabilization apparatus based on whether or not the detected current value falls within a second allowable range narrower than the first allowable range, and notifies that a repair or replacement time approaches.

8. The image stabilization apparatus according to claim 6, wherein the image stabilization controller detects a drive duty of a PWM drive circuit.

9. An image pickup apparatus comprising:
   a camera unit comprising an image pickup device and an image pickup optical system;
   a case which accommodates the camera unit;
   a cover member which covers and protects part of the camera unit; and
   the image stabilization apparatus according to claim 1.

10. An image stabilization apparatus comprising:
    a fixed barrel;

a movable barrel which holds an optical lens or an image pickup device;

a support member which movably supports the movable barrel with respect to the fixed barrel within a plane orthogonal to an optical axis of the optical lens or within a plane along a light receiving surface of the image pickup device;

a drive unit comprising a magnet and a coil, the drive unit driving the movable barrel with respect to the fixed barrel;

a drive circuit which drives and controls the drive unit;

a position detection circuit which detects a position of the movable barrel within the plane; and a judgment circuit which (i) detects, when the drive circuit drives and controls, via the drive unit, the movable barrel so as to move to a predetermined target position, a deviation between the position of the movable barrel detected by the position detection circuit and the predetermined target position, and (ii) judges a possibility that a malfunction has occurred in the image stabilization apparatus, based on whether or not the deviation falls within an allowable range, wherein when the judgment circuit judges that there is a possibility that a malfunction has occurred in the image stabilization apparatus, the drive circuit restricts a moving range of the movable barrel to a range which is narrower than a normal range and in which image stabilization is capable of being performed by moving the movable barrel.

11. The image stabilization apparatus according to claim 10, wherein the judgment circuit detects a deviation between the position of the movable barrel detected by the position detection circuit and the predetermined target position within a second defined time period after a lapse of a first defined time period after the drive circuit starts to drive and control the movable barrel to move to the predetermined target position via the drive unit, compares a maximum value and a minimum value of the deviation with respective predefined reference allowable values, and judges the possibility that a malfunction has occurred in the image stabilization apparatus.

12. The image stabilization apparatus according to claim 10, wherein when the drive circuit causes the movable barrel to move to the predetermined target position via the drive unit, and drives and controls the movable barrel to perform a sine wave drive centered on the predetermined target position, the judgment circuit detects a deviation between a real position of the movable barrel detected by the position detection circuit and a defined position centered on the predetermined target position at which the movable barrel has to be located during the sine wave drive, and judges the possibility that a malfunction has occurred in the image stabilization apparatus based on whether or not the deviation falls within a first allowable range.

13. The image stabilization apparatus according to claim 10, wherein from among a plurality of predetermined target positions, a first target position is a position in a vicinity of a peripheral edge within a range in which the movable barrel is movable within the plane, when the judgement circuit judges that there is a possibility that a malfunction has occurred in the image stabilization apparatus with the movable barrel at the first target position, the judgement circuit further judges a possibility that a malfunction has occurred in the image stabilization apparatus with the movable barrel at a second target position closer to a center within the range in which the movable barrel is movable than the first target position, and when the judgement circuit judges that there is no possibility that a malfunction has occurred in the image stabilization apparatus with the movable barrel at the second target position, the drive circuit restricts the moving range of the movable barrel to the second target position.

14. An image pickup apparatus comprising:

a camera unit comprising an image pickup device and an image pickup optical system;

a case which accommodates the camera unit;

a cover member which covers and protects part of the camera unit; and the image stabilization apparatus according to claim 10.

* * * * *

UNITED STATES PATENT AND TRADEMARK OFFICE
CERTIFICATE OF CORRECTION

PATENT NO. : 10,123,004 B2
APPLICATION NO. : 15/366930
DATED : November 6, 2018
INVENTOR(S) : Hiroshi Ezawa et al.

Page 1 of 1

It is certified that error appears in the above-identified patent and that said Letters Patent is hereby corrected as shown below:

In the Claims

Column 39, Line 52, Claim 1, Line 18, after "barrel" delete "so as".

Column 40, Lines 15 and 16, Claim 3, Lines 10 and 11, after "judges the" delete "operation".

Column 40, Line 22, Claim 4, Line 4, after "barrel" delete "can move".

Column 41, Line 16, Claim 10, Line 18, after "barrel" delete "so as".

Signed and Sealed this
Twenty-ninth Day of January, 2019

Andrei Iancu
*Director of the United States Patent and Trademark Office*